US010565363B2

(12) United States Patent
Sakumoto

(10) Patent No.: US 10,565,363 B2
(45) Date of Patent: Feb. 18, 2020

(54) INFORMATION PROCESSING DEVICE, INFORMATION PROCESSING METHOD, AND INFORMATION PROCESSING SYSTEM FOR CANCELING DEVICE RESTRICTION BASED ON SIMILARITY BETWEEN FEATURE-QUANTITY VECTORS OF ASSOCIATED DEVICES

(71) Applicant: SONY CORPORATION, Tokyo (JP)

(72) Inventor: Koichi Sakumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 188 days.

(21) Appl. No.: 15/321,849

(22) PCT Filed: May 13, 2015

(86) PCT No.: PCT/JP2015/063731
§ 371 (c)(1),
(2) Date: Dec. 23, 2016

(87) PCT Pub. No.: WO2016/024424
PCT Pub. Date: Feb. 18, 2016

(65) Prior Publication Data
US 2017/0132407 A1    May 11, 2017

(30) Foreign Application Priority Data

Aug. 11, 2014 (JP) .................. 2014-163751
Jan. 9, 2015 (JP) .................. 2015-003384

(51) Int. Cl.
*G06F 21/44* (2013.01)
*G06F 21/40* (2013.01)
(Continued)

(52) U.S. Cl.
CPC .............. *G06F 21/44* (2013.01); *G06F 21/40* (2013.01); *G06F 21/45* (2013.01); *H04W 12/08* (2013.01)

(58) Field of Classification Search
None
See application file for complete search history.

(56) References Cited

U.S. PATENT DOCUMENTS

| 2012/0164978 A1* | 6/2012 | Conti ..................... G06F 21/32 455/411 |
| 2013/0305081 A1* | 11/2013 | Agnihotram ........ G06F 11/0793 714/2 |
| 2015/0347730 A1* | 12/2015 | Matus ..................... G06F 21/32 726/19 |

FOREIGN PATENT DOCUMENTS

| EP | 2605172 A2 | 6/2013 |
| JP | 2008-311726 | 12/2008 |

(Continued)

OTHER PUBLICATIONS

Mayrhofer R et al: "Spontaneous mobile device authentication based on sensor data", Information Security Technical Report, Elsevier Advanced Technology, Amsterdam, NL, vol. 13, No. 3, Aug. 1, 2008, pp. 136-150, XP025658704, ISSN: 1363-4127, DOI: 10.1016/J.ISTR.2008.10.005 (Year: 2008).*

(Continued)

*Primary Examiner* — Andrew J Steinle
(74) *Attorney, Agent, or Firm* — Paratus Law Group, PLLC

(57) ABSTRACT

There is provided an information processing device, an information processing method, and an information processing system, which are capable of ensuring security and canceling a restriction through a simple procedure, the information processing device including: an acquisition unit that acquires a feature-quantity vector directly or indirectly (Continued)

indicating variations in a time series in at least one of a position and orientation of a housing of each of a plurality of different devices that are previously associated; and a controller that cancels a predetermined restriction set in advance, on the basis of the acquired feature-quantity vector corresponding to each of the plurality of devices.

21 Claims, 13 Drawing Sheets

(51) Int. Cl.
    *G06F 21/45*     (2013.01)
    *G06F 12/08*     (2016.01)
    *H04W 12/08*     (2009.01)

(56) References Cited

FOREIGN PATENT DOCUMENTS

JP     2014-110638     6/2014
WO   WO2014/115605 A1   7/2014

OTHER PUBLICATIONS

Jan. 17, 2018, European Search Report issued for related application No. 15832305.5.
Mayrhofer et al., Spontaneous mobile device authentication based on sensor data, Information Security Technical Report, Oct. 2008, pp. 136-150.
Jun. 27, 2019, Chinese Office Action issued for related CN Application No. 201580041649.0.

\* cited by examiner

INFORMATION PROCESSING DEVICE, INFORMATION PROCESSING METHOD, AND INFORMATION PROCESSING SYSTEM FOR CANCELING DEVICE RESTRICTION BASED ON SIMILARITY BETWEEN FEATURE-QUANTITY VECTORS OF ASSOCIATED DEVICES

CROSS REFERENCE TO PRIOR APPLICATION

This application is a National Stage Patent Application of PCT International Patent Application No. PCT/JP2015/063731 (filed on May 13, 2015) under 35 U.S.C. § 371, which claims priority to Japanese Patent Application Nos. 2015-003384 (filed on Jan. 9, 2015) and 2014-163751 (filed on Aug. 11, 2014), which are all hereby incorporated by reference in their entirety.

TECHNICAL FIELD

The present disclosure relates to an information processing device, an information processing method, and an information processing system.

BACKGROUND ART

Recently, information processing devices that provide various functions to a user, such as personal computers (PCs) and cellular phones (smartphones), have been propagated. Such information processing devices may have a lock function for partially restricting functions. In addition, various methods have been proposed as methods for canceling such restriction, and functions for restriction cancelation on the basis of these methods include ensuring security by requiring authentication when the restriction is canceled.

CITATION LIST

Patent Literature

Patent Literature 1: JP 2008-311726A

DISCLOSURE OF INVENTION

Technical Problem

Meanwhile, there is a need for a scheme capable of ensuring security and canceling the restriction through a simple procedure as a function for canceling the restriction by the aforementioned lock function.

Accordingly, the present disclosure proposes an information processing device, an information processing method, and an information processing system which are capable of ensuring security and canceling a restriction through a simple procedure.

Solution to Problem

According to the present disclosure, there is provided an information processing device including: an acquisition unit that acquires a feature-quantity vector directly or indirectly indicating variations in a time series in at least one of a position and orientation of a housing of each of a plurality of different devices that are previously associated; and a controller that cancels a predetermined restriction set in advance, on the basis of the acquired feature-quantity vector corresponding to each of the plurality of devices.

According to the present disclosure, there is provided an information processing method including: acquiring a feature-quantity vector directly or indirectly indicating variations in a time series in at least one of a position and orientation of a housing of each of a plurality of different devices previously associated; and canceling, by a processor, a predetermined restriction set in advance, on the basis of comparison between the acquired feature-quantity vectors corresponding to the plurality of devices.

According to the present disclosure, there is provided an information processing system including: a plurality of devices each including a detection unit that detects variations in a time series in at least one of a position and orientation of a housing; an acquisition unit that acquires a feature-quantity vector directly or indirectly indicating the detected variations in the time series, for each of the plurality of devices; and a controller that cancels a predetermined restriction set in advance on the basis of comparison between the acquired feature-quantity vectors corresponding to the plurality of devices.

Advantageous Effects of Invention

According to the present disclosure as described above, an information processing device, an information processing method, and an information processing system, which are capable of ensuring security and canceling a restriction through a simple procedure, are provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
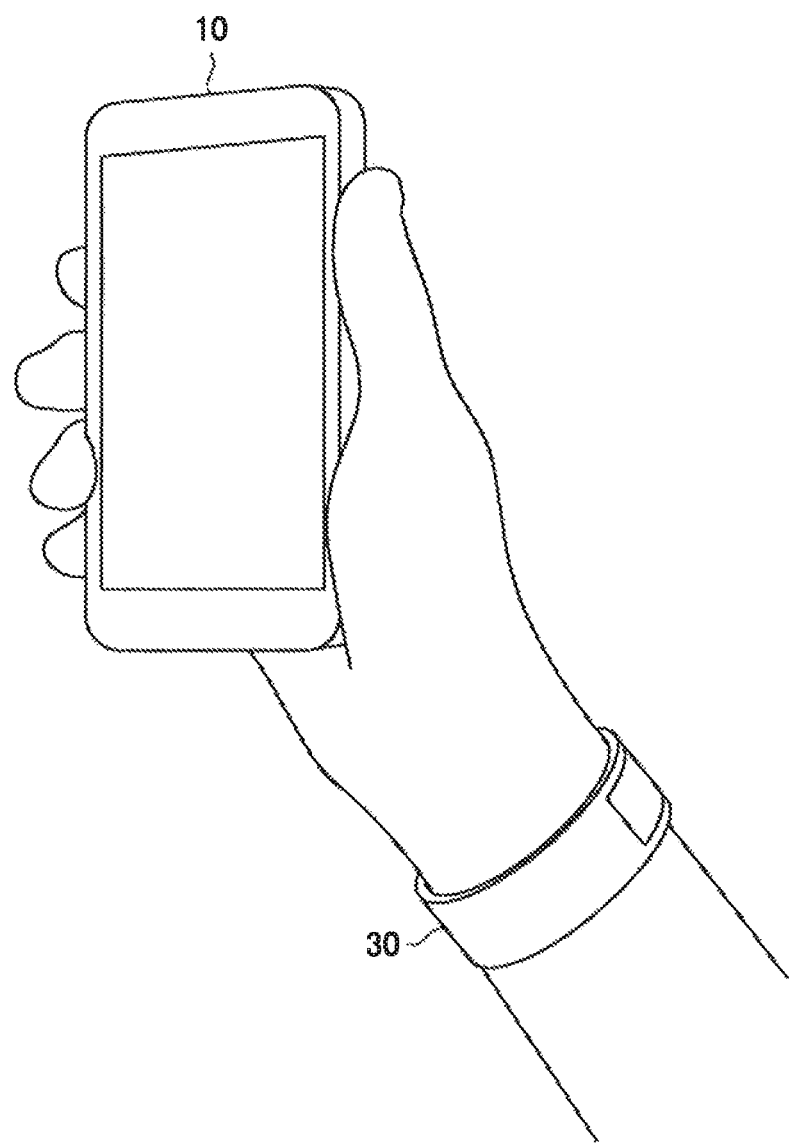
FIG. 1 is an explanatory diagram of an example of an approximate configuration of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

A description will be given in the following order.
1. Overview
2. Functional configuration
3. Processing
4. Modification examples
4.1. Modification example 1: Example of use pattern
4.2. Modification example 2: Example of system configuration
4.3. Modification example 3: Control example according to restriction cancelation
4.4. Modification example 4: Example of information presentation
5. Hardware configuration
6. Conclusion

1. OVERVIEW

First of all, an overview of an information processing system according to an embodiment of the present disclosure will be described. For example, FIG. 1 is an explanatory diagram of an example of an approximate configuration of the information processing system according to the present embodiment.

As illustrated in FIG. 1, the information processing system according to the present embodiment includes an information processing device 10 and a wearable terminal 30. The information processing device 10 may be configured as a so-called portable information processing device such as a smartphone, for example. In addition, the wearable terminal 30 is configured to be able to communicate with the information processing device 10 through a network based on a communication standard such as Bluetooth (registered trademark) or Wi-Fi (registered trademark). Meanwhile, the present disclosure exemplifies a case in which the wearable terminal 30 is configured as a so-called wrist-watch type information processing terminal, as illustrated in FIG. 1, to facilitate understanding of characteristics of the information processing system according to the present embodiment. However, the configuration of the wearable terminal 30 is not necessarily limited to the wrist-watch type information processing terminal.

The information processing system according to the present embodiment provides a scheme for enabling cancelation of a predetermined restriction set by a so-called lock function by associating the information processing device 10 and the wearable terminal 30 connected through the network. Accordingly, tasks of the information processing system will be arranged by describing an example of a scheme for canceling the restriction by the lock function as a comparison example to facilitate understanding of the characteristics of the information processing system according to the present embodiment.

Figure 2:
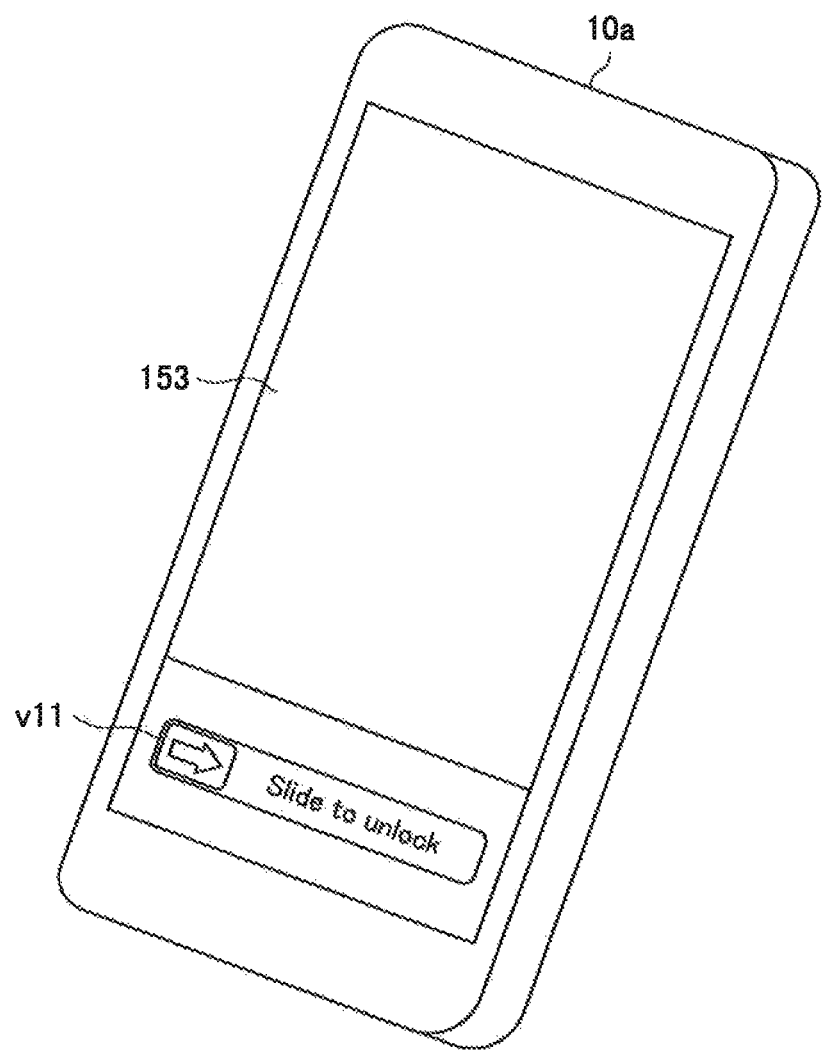
FIG. 2 is an explanatory diagram of an example of a restriction cancelation function according to comparison example 1.

First, an example of a function for canceling the restriction by the lock function (referred to hereinafter as a "restriction cancelation function") will be described as comparison example 1 with reference to FIG. 2. FIG. 2 is an explanatory diagram of an example of the restriction cancelation function according to comparison example 1. Further, when the information processing device 10 according to comparison example 1 is discriminated from the information processing device 10 according to the present embodiment, the information processing device 10 according to comparison example 1 may be referred to as an "information processing device 10*a*" hereinafter.

In the example illustrated in FIG. 2, the information processing device 10*a* displays a slider v11 for unlocking on a display unit 153 having a display surface configured as a touch panel and cancels a restriction on the basis of a user operation applied to the slider v11. Specifically, the information processing device 10*a* cancels a predetermined restriction set by the lock function when sliding of the slider v11 in a predetermined direction by a swiping operation or the like is sensed.

That is, a user may cancel the restriction on the basis of the swiping operation, which is a relatively simple operation, by applying the restriction cancelation function according to comparison example 1 illustrated in FIG. 2, Meanwhile, when the restriction cancelation function according to comparison example 1 is applied, authentication processing is not performed when the restriction is canceled and thus anyone may cancel the restriction and security is not ensured.

Figure 3:
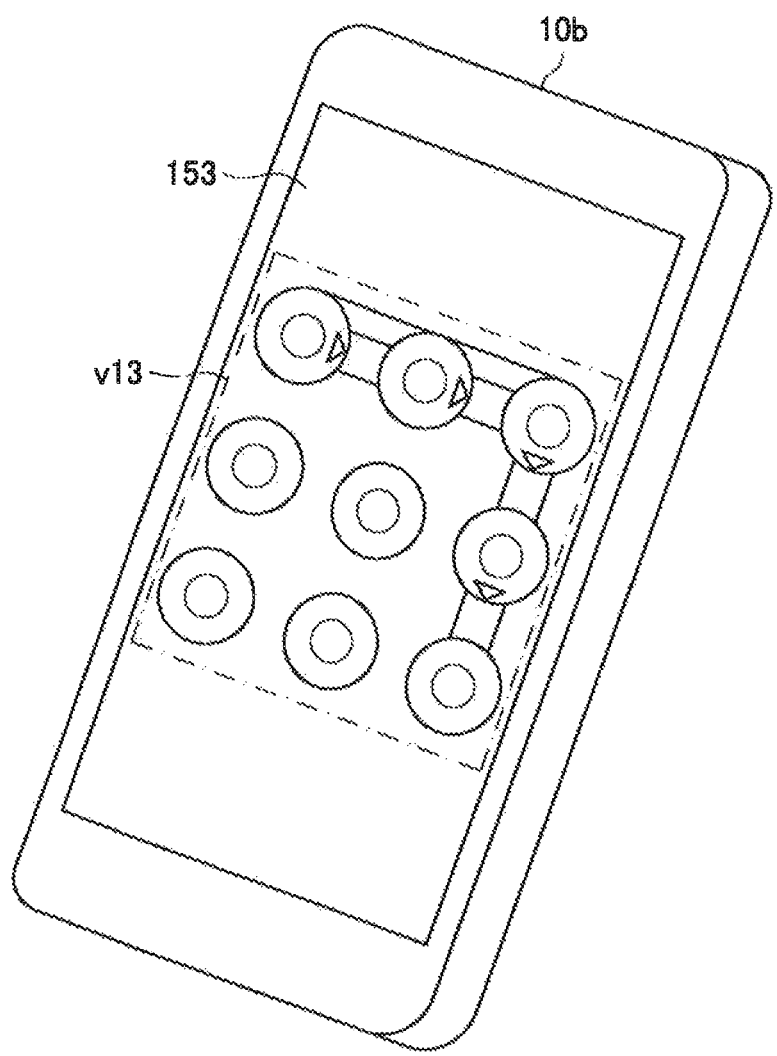
FIG. 3 is an explanatory diagram of an example of a restriction cancelation function according to comparison example 2.

In contrast, FIG. 3 illustrates an example of a case in which security ensured through authentication processing when the restriction by the lock function is canceled. Furthermore, the example illustrated in FIG. 3 will be described as comparison example 2 hereinafter. That is, FIG. 3 is an explanatory diagram of an example of a restriction cancelation function according to comparison example 2. In addition, when the information processing device 10 according to comparison example 2 is discriminated from the information processing device 10 according to the present embodiment, the information processing device 10 according to comparison example 2 may be referred to as an "information processing device 10*b*."

In the example of FIG. 3, the information processing device 10*b* compares an operation pattern input by the user with a previously registered operation pattern and cancels the restriction depending on whether the input operation pattern is consistent with the previously registered operation pattern. Specifically, the information processing device 10*b* displays an input screen v13 of an operation pattern, on which a plurality of points are indicated, on the display unit 153 having the display surface configured as a touch panel. In addition, the information processing device 10*b* compares an operation pattern that is input to connect a plurality of arbitrary points on the input screen v13 with the previously registered operation pattern on the basis of a user operation and cancels the restriction when the input operation pattern is consistent with the previously registered operation pattern.

According to this configuration, only a user who knows previously registered information, for example, the operation pattern or the like, may cancel the restriction using the restriction cancelation function according to comparison example 2, and thus security is ensured. Meanwhile, as a method for enabling only a user who knows the previously registered information to cancel the restriction, there is a method of receiving a password such as a personal identification number (PIN) code as a user input.

Meanwhile, in the method using information input by the user to the input screen displayed on the display unit 153 for authentication, like the restriction cancelation function according to comparison example 2 illustrated in FIG. 3, the information for authentication may be exposed to other people according to so-called shoulder hacking. That is, a malicious person may view the information for authentication (e.g., operation pattern) input by the user of the information processing device 10b to the input screen v13 without permission and illegally acquire the information for canceling the restriction of the information processing device 10b.

In addition, as another example, a restriction cancelation function for further enhancing a security level by using bio-information of a user has been provided in recent years. Hereinafter, an example of the restriction cancelation function using bio-information of a user will be described as comparison example 3. Meanwhile, when the information processing device 10 according to comparison example 3 is discriminated from the information processing device 10 according to the present embodiment, the information processing device 10 according to comparison example 3 may be referred to as an "information processing device 10c" in the following.

As an example of the restriction cancelation function according to comparison example 3, a method using a face recognition technology may be considered. In this case, the information processing device 10c photographs a face image of a user through an imaging unit, extracts characteristic parts, such as the eyes, nose, cheekbones or the shape of the chin, from the face image, compares the extracted characteristics with characteristics of a previously registered face image, and cancels the restriction when the extracted characteristics are consistent with the previously registered characteristics.

When the face recognition technology is used in this manner, the user need not input any information for authentication to the input screen. Accordingly, exposure of the information for restriction cancelation (e.g., authentication information) due to shoulder hacking can be prevented when the face recognition technology is used.

Meanwhile, since face authentication uses a face image of a user, captured through the imaging unit for authentication, authentication accuracy may decrease depending on a face image photographing environment such as surrounding brightness. Furthermore, a malicious user may pretend to be the user who is an authentication object by illegally using a still image or a moving image of the user who is the authentication object.

In addition, a method using a fingerprint authentication technology may be considered as an example of the restriction cancelation function according to comparison example 3. In this case, the information processing device 10c extracts characteristic parts from a fingerprint of a user, detected through a dedicated device, compares the extracted characteristics with characteristics of a previously registered fingerprint, and cancels the restriction when the extracted characteristics are consistent with the previously registered characteristics.

When the fingerprint authentication technology is used in this manner, the user need not any input information for authentication to the input screen. Accordingly, exposure of human information due to shoulder hacking can be prevented when the fingerprint authentication technology is used.

Meanwhile, accuracy of fingerprint authentication may decrease depending on the state of a finger used for authentication, such as a wet finger or a dry finger. When the user is wearing gloves or the like, of course, the user has to take off the gloves or the like that be or she is wearing before performing authentication because it is difficult to input a fingerprint through gloves, which is inconvenient.

Furthermore, when fingerprint authentication is used, the information processing device 10c needs to be equipped with a dedicated device for detecting a fingerprint.

When the restriction is canceled using bio-information as in the restriction cancelation function according to comparison example 3, although a relatively high security level may be secured, authentication accuracy may decrease depending on an environment or state during authentication and it is not convenient for use. Furthermore, when the restriction is canceled using bio-information, a dedicated device needs to be installed in some methods and installation of the device may cause increase in manufacturing costs and housing size.

Figure 4:
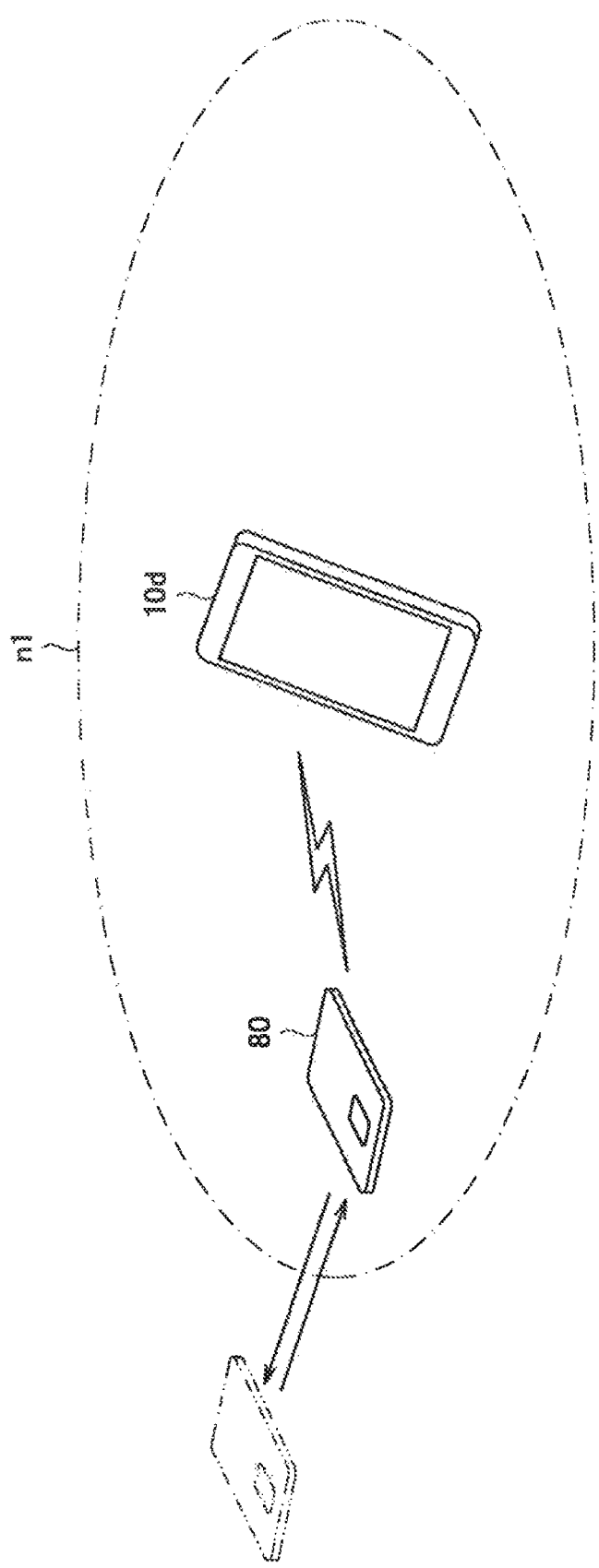
FIG. 4 is an explanatory diagram of an example of a restriction cancelation function according to comparison example 4.

Next, an example of a restriction cancelation function using short range radio communication will be described as comparison example 4 with reference to FIG. 4. FIG. 4 is an explanatory diagram of an example of the restriction cancelation function according to comparison example 4. Meanwhile, when the information processing device 10 according to comparison example 4 is discriminated from the information processing device 10 according to the present embodiment, the information processing device 10 according to comparison example 4 may be referred to as an "information processing device 10d" below.

As illustrated in FIG. 4, the information processing device 10d according to comparison example 4 is configured to communicate with a token 80 that is an authentication medium for restriction cancelation, for example, through a wireless network n1 based on a communication standard such as Bluetooth (registered trademark). Further, FIG. 4 schematically illustrates communication coverage (referred to hereinafter as "communication coverage of the information processing device 10d") of the network n1 in which the information processing device 10d may communicate with an external device (e.g., token 80). That is, the token 80 may transmit/receive information to/from the information processing device 10d through the network n1 when the token 80 is located within the communication coverage of the information processing device 10d.

The information processing device 10d according to comparison example 4 performs authentication processing for restriction cancelation by executing a predetermined communication sequence with the token 80 when the token 80 enters the communication coverage thereof on the basis of the aforementioned configuration.

Specifically, when the token 80 enters the communication coverage of the information processing device 10d, the information processing device 10d requests notification of authentication information of the token 80. The token 80 receives the request from the information processing device 10d and notifies the information processing device 10d of the authentication information previously stored in a storage unit thereof. In this way, the information processing device 10*d* acquires the authentication information stored in the storage unit of the token 80 from the token 80 located in the coverage of the information processing device 10*d*.

In addition, the information processing device 10*d* compares the authentication information acquired from the token 80 with previously registered authentication information and cancels the restriction when the acquired authentication information is consistent with the previously registered authentication information.

In addition, when the token 80 leaves the communication coverage of the information processing device 10*d*, the information processing device 10*d* senses leaving of the token 80 from the communication coverage and waits for a connection request from the departed token 80. At this time, when the information processing device 10*d* does not receive the connection request from the token 80 within a predefined time, the information processing device 10*d* may restrict use of the restriction function, which is canceled when the token 80 enters the communication coverage of the information processing device 10*d*, again.

Incidentally, at least one of the information processing device 10*d* and the token 80 may sense the token 80 entering and leaving the communication coverage of the information processing device 10*d* by checking whether there is a response from the other.

According to this configuration, the user may cancel the restriction without a complicated operation by entering the communication coverage of the information processing device 10*d* while carrying the token 80 storing authentication information of the user. Similarly, the user may restrict use of the predetermined function again without a complicated operation by leaving the communication coverage of the information processing device 10*d* while carrying the token 80.

On the other hand, the restriction cancelation function according to comparison example 4, described with reference to FIG. 4, automatically cancels the restriction irrespective of the intention of the user when the token 80 enters the communication coverage of the information processing device 10*d*. Accordingly, when the restriction cancelation function according to comparison example 4 is used, the restriction may be canceled at a timing that is not intended by the user and, when the area of the communication coverage of the information processing device 10*d* is not sufficiently limited, operation is not necessarily effectively performed to ensure security.

Meanwhile, since wireless communication standards include a standard of measuring a distance between devices according to radio wave strengths of signals during communication, there is a method of restricting a range having the information processing device 10*d* as an origin (i.e., a distance from the information processing device 10*d*) in which the restriction cancelation function operates by using the function.

However, the accuracy of measurement of a distance between devices using radio wave strengths of signals is not necessarily high and, when there is shielding or the like, the accuracy may further decrease. Accordingly, a range in which the restriction cancelation function is executed becomes unstable depending on a usage environment. In an extreme example, the restriction is canceled at a timing that is not intended by the user and approach of the token 80 to the information processing device 10*d* is not detected, and thus the restriction cancelation function is not executed.

Accordingly, a system capable of ensuring security and canceling the restriction through a simpler procedure at a timing intended by the user is proposed as the information processing system according to the present embodiment.

Figure 5:
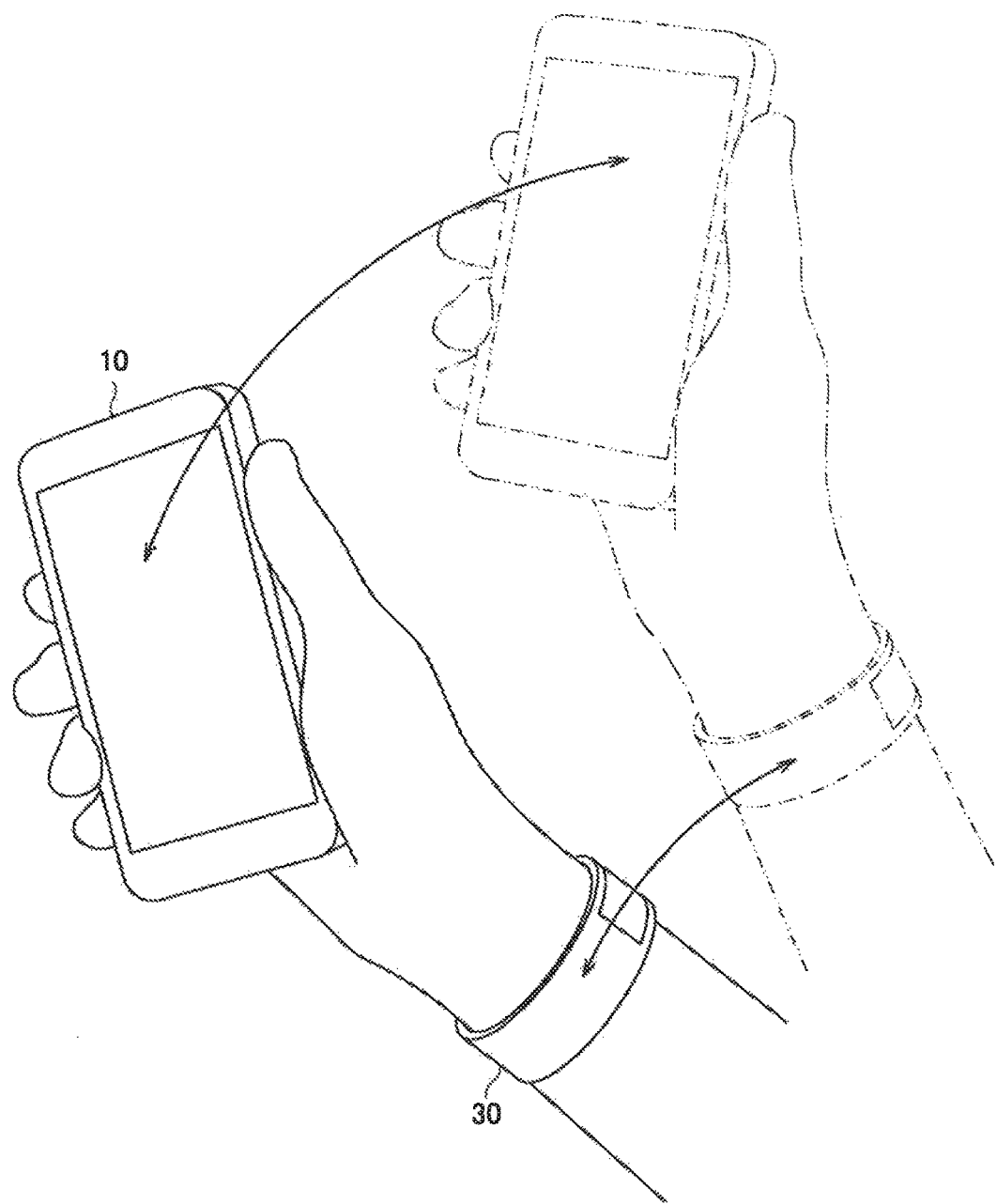
FIG. 5 is an explanatory diagram of a restriction cancelation function of the information processing system according to the embodiment.

For example, FIG. 5 is an explanatory diagram of the restriction cancelation function of the information processing system according to the present embodiment. As illustrated in FIG. 5, in the information processing system according to the present embodiment, the user shakes both the information processing device 10 and the wearable terminal 30 that be or she carries through an operation such as shaking the information processing device 10 and the wearable terminal 30 when canceling the restriction. In the example shown in FIG. 5, the user wears the wrist-watch type wearable terminal 30 on a wrist and shakes both the information processing device 10 and the wearable terminal 30 while gripping the information processing device 10 with the hand on which be or she wears the wearable terminal 30.

The information processing device 10 acquires a feature-quantity vector (e.g., displacement data) that directly or indirectly indicates variations in a time series, based on shaking, in at least one of the position and orientation of the housing of each of the information processing device 10 and the wearable terminal 30. The information processing device 10 cancels a predetermined restriction set by the lock function on the basis of the feature-quantity vector acquired for each of the information processing device 10 and the wearable terminal 30. Specifically, the information processing device 10 performs one or both of determination of whether the information processing device 10 and the wearable terminal 30 are shaken and determination of similarity between the feature-quantity vectors on the basis of the feature-quantity vectors of the information processing device 10 and the wearable terminal 30. Then, the information processing device 10 cancels the predetermined restriction set by the lock function on the basis of the performed determination result.

For example, both the information processing device 10 and the wearable terminal 30 are held by the same hand (arm) in the example shown in FIG. 5. Accordingly, when the user shakes the hand (arm) holding the information processing device 10 and the wearable terminal 30, variations in time series feature-quantity vectors) in the positions and orientations of the housings of the information processing device 10 and the wearable terminal 30 are similar, in addition, when the user intentionally shakes the information processing device 10 and the wearable terminal 30, the respective feature-quantity vectors become waveforms having unique characteristics (e.g., unique frequency spectra) different from those in a case in which the user does not intentionally shakes each device.

Additionally, communication between the wearable terminal 30 and the information processing device 10 is established on the basis of previous association such as paring based on Bluetooth (registered trademark) standard, for example. In view of this, the wearable terminal 30 may be regarded as a device having ensured reliability for canceling the restriction set in the information processing device 10 like the token 80 illustrated in comparison example 4.

In this way, in the information processing system according to the present embodiment, the information processing device 10 acquires the feature-quantity vector (e.g., displacement data) corresponding to the previously associated wearable terminal 30 and cancels the predetermined restriction set by the lock function on the basis of the acquired feature-quantity vector and its own feature-quantity vector.

Here, the information processing device 10 compares its own feature-quantity vector with the feature-quantity vector of the wearable terminal 30 and may cancel the predetermined restriction set by the lock function when the feature-quantity vectors are similar. Furthermore, as another example, the information processing device 10 cancels the predetermined restriction set by the lock function when both the feature-quantity vector of the information processing device 10 and the feature-quantity vector of the wearable terminal 30 have predetermined characteristics.

According to such configurations, different data is generated whenever the restriction is canceled as the acquired feature-quantity vector (e.g., displacement data) in the information processing system according to the present embodiment Therefore, a situation in which a malicious user illegally cancels the restriction due to exposure of information for restriction cancelation caused by a furtive glance, such as so-called shoulder hacking, can be prevented according to the information processing system according to the present embodiment.

In addition, in the information processing system according to the present embodiment, a malicious user has difficulty canceling the restriction of the information processing device 10 through the information processing device 10 alone. That is, when the malicious user intends to cancel the restriction of the information processing device 10, the malicious user needs to obtain both the information processing device 10 and the wearable terminal 30. Furthermore, a probability of occurrence of a situation in which the owner of the information processing device 10 and the wearable terminal 30 simultaneously loses both the information processing device 10 and the wearable terminal 30 is lower than a probability of occurrence of a situation in which the owner loses only one of the information processing device 10 and the wearable terminal 30. Accordingly, the information processing system according to the present embodiment may ensure relatively high security from the viewpoint of operation.

Moreover, in the information processing system according to the present embodiment, the user needs to intentionally shake both the information processing device 10 and the wearable terminal 30 when canceling the restriction. Accordingly, a situation in which the restriction is canceled at a timing that is not intended by the user as in the example mentioned above as comparison example 4 (refer to FIG. 4) can be prevented.

Incidentally, if variations in a time series in at least one of the position and orientation of a housing based on shaking may be directly or indirectly indicated, content of data acquired as a feature-quantity vector is not particularly limited, which will be described in detail below. Further, the feature-quantity vectors in the present disclosure may include data that represents a one-dimensional vector (i.e., a scalar value).

The overview of the information processing system according to the present embodiment has been described with reference to FIG. 5. Hereinafter, the information processing system according to the present embodiment will be described in more detail.

2. FUNCTIONAL CONFIGURATION

Figure 6:
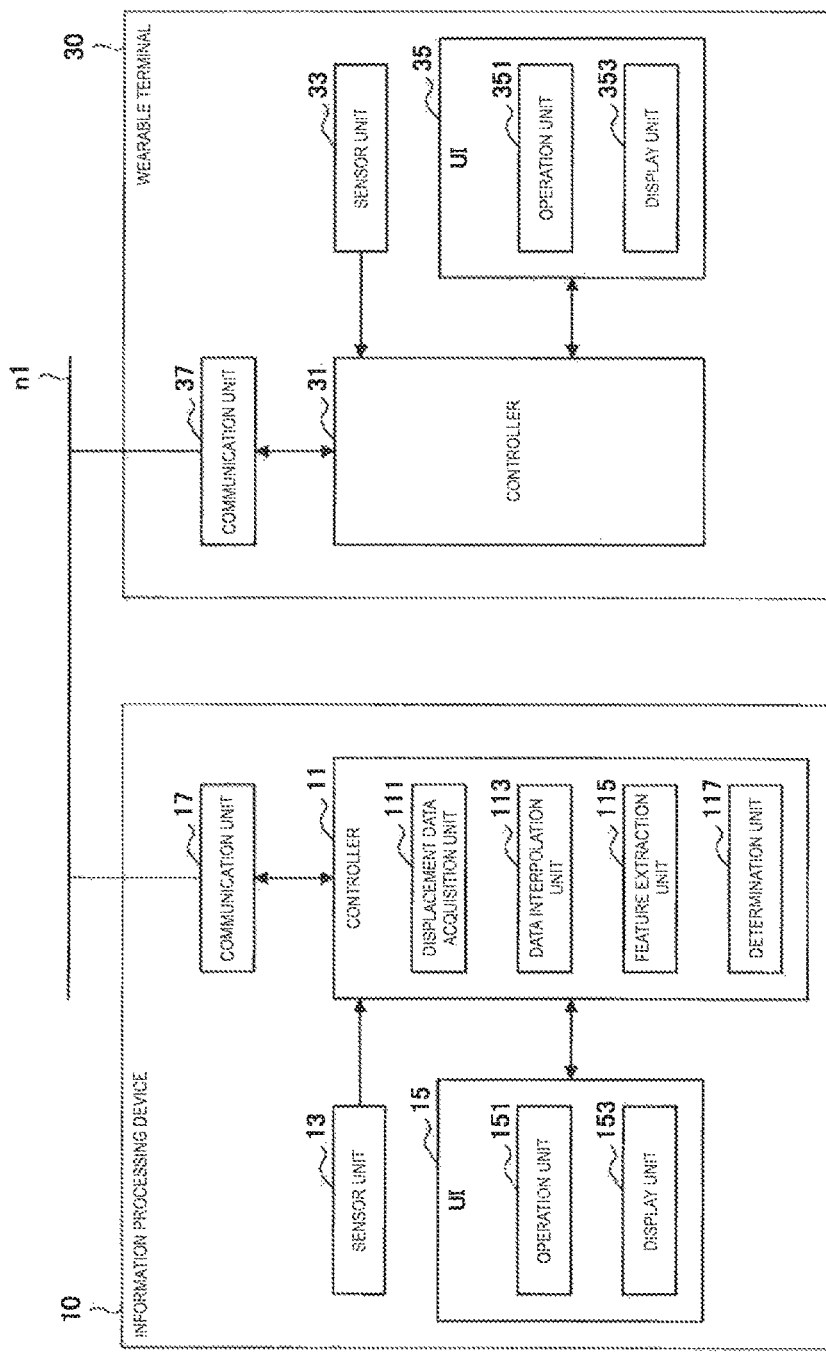
FIG. 6 is a block diagram illustrating an example of a functional configuration of the information processing system according to the embodiment.

An example of a functional configuration of the information processing system according to the present embodiment will be described with reference to FIG. 6. FIG. 6 is a block diagram illustrating an example of a functional configuration of the information processing system according to the present embodiment.

As illustrated in FIG. 6, the information processing device 10 includes a controller 11, a sensor unit 13, a UI 15 and a communication unit 17. In addition, the wearable terminal 30 includes a controller 31, a sensor unit 33, a UI 35 and a communication unit 37.

The communication unit 37 is a component through which communication between the wearable terminal 30 and the information processing device 10 through the network n1 is established and each component in the wearable terminal 30 transmits and receives data through the network n1. The communication unit 37 may be configured as a communication device for realizing wireless communication such as communication based on the IEEE 802.15 standard such as Bluetooth (registered trademark) standard or communication based on the IEEE 802.11 standard such as Wi-Fi (registered trademark).

Hereinafter, when each component in the wearable terminal 30 transmits/receives data to/from the information processing device 10 via the network n1, it is assumed that transmission and reception of data are performed through the communication unit 37 even if not specifically described.

The sensor unit 33 detects variations in at least one of the position and orientation of the housing of the wearable terminal 30 and sequentially outputs information indicating the detected variations to the controller 31. The sensor unit 33 may be implemented as various sensors that may detect variations in the position and orientation of a predetermined housing, such as an acceleration sensor and an angular velocity sensor.

Further, the operation of the sensor unit 33 may be temporarily stopped on the basis of control of the controller 31 and the stopped operation may be resumed on the basis of control of the controller 31.

The UI 35 is a user interface through which the user operates the wearable terminal 30. For example, the UI 35 may include an operation unit 351 and a display unit 353.

As a specific example of the operation unit 351, an input device through which the user operates the wearable terminal 30, such as a button or a touch panel, may be considered. In addition, as a specific example of the display unit 353, an output device through which the wearable terminal 30 displays information to the user, such as a display, may be considered.

The controller 31 transmits information indicating variations in a time series in at least one of the position and orientation of the housing of the wearable terminal 30, which are output from the sensor unit 33, as displacement data to the information processing device 10 through the network n1. Furthermore, the controller 31 may transmit the displacement data to the information processing device 10 on the basis of an instruction from the information processing device 10 through the network n1. As another example, the controller 31 may transmit the displacement data to the information processing device 10 on the basis of an instruction from the user through the UI 35.

In addition, the controller 31 may control the operation of the sensor unit 33 on the basis of an instruction from the user through the UI 35. As a specific example, the controller 31 may temporarily stop the operation of the sensor unit 33 on the basis of an instruction from the user through the UI 35. Further, the controller 31 may resume the operation of the sensor unit 33 on the basis of an instruction from the user through the UI 35.

The communication unit 17 is a component through which communication between the information processing device 10 and the wearable terminal 30 through the network n1 is established and each component in the information processing device 10 transmits and receives data through the network n1. The communication unit 17 may be configured as a communication device for realizing wireless communication such as communication based on the IEEE 802.15 standard such as Bluetooth (registered trademark) standard or communication based on the IEEE 802.11 standard such as Wi-Fi (registered trademark).

Hereinafter, when each component in the information processing device 10 transmits/receives data to/from the wearable terminal 30 via the network n1, it is assumed that transmission and reception of data are performed through the communication unit 17 even if not specifically described.

The sensor unit 13 detects variations in at least one of the position and orientation of the housing of the information processing device 10 and sequentially outputs information indicating the detected variations to the controller 11. The sensor unit 13 may be implemented as various sensors that may detect variations in the position and orientation of a predetermined housing, such as an acceleration sensor and an angular velocity sensor.

Further, the operation of the sensor unit 13 may be temporarily stopped on the basis of control from the controller 11 and the stopped operation may be resumed on the basis of control from the controller 11.

The UI 15 is a user interface through which the user operates the information processing device 10. For example, the UI 15 may include an operation unit 151 and a display unit 153.

As a specific example of the operation unit 151, an input device through which the user operates the wearable terminal 30, such as a button or a touch panel, may be considered. In addition, as a specific example of the display unit 153, an output device through which the information processing device 10 displays information to the user, such as a display, may be considered.

The controller 11 includes a displacement data acquisition unit 111, a data interpolation unit 113, a feature extraction unit 115 and a determination unit 117.

(Displacement Data Acquisition Unit 111)

The displacement data acquisition unit 111 acquires information indicating variations in a time series in at least one of the position and orientation of the housing of the information processing device 10, which is output from the sensor unit 13, as displacement data on the basis of an instruction from the user through the UI 15 (i.e., operation unit 151).

In addition, the displacement data acquisition unit 111 acquires displacement data indicating variations in a time series in at least one of the position and orientation of the housing of the wearable terminal 30 from the wearable terminal 30 through the network n1. Here, the displacement data acquisition unit 111 may instruct the wearable terminal 30 to transmit the displacement data. In addition, the displacement data acquisition unit 111 may passively wait for transmission of the displacement data from the wearable terminal 30 in another example.

Moreover, the displacement data acquisition unit 111 may initiate acquisition of displacement data by being triggered by execution of a predetermined process (or an event generated according to execution of the process). As a specific example, when the display unit 153 displays a screen for restriction cancelation, the displacement data acquisition unit 111 may initiate acquisition of displacement data by being triggered by execution of a process according to display of the screen.

In addition, a timing at which the displacement data acquisition unit 111 terminates acquisition of displacement data may be explicitly designated. As a specific example, when a predetermined restriction set by the lock function is canceled, the displacement data acquisition unit 111 may terminate acquisition of displacement data by being triggered by cancelation of the restriction.

As another example, when the wearable terminal 30 terminates a process for transmitting the displacement data (e.g., when an application is finished), the displacement data acquisition unit 111 may terminate acquisition of the displacement data by being triggered by termination of the process.

As described above, a situation in which processing according to acquisition of displacement data and transmission of the displacement data is constantly performed can be prevented, for example, and power consumption can be reduced by explicitly designating the timing at which the displacement data acquisition unit 111 terminates acquisition of the displacement data.

Of course, the aforementioned example is merely an example, and as long as a timing at which the displacement data acquisition unit 111 initiates acquisition of displacement data and a timing at which the displacement data acquisition unit 111 terminates acquisition of the displacement data may be controlled, a configuration and a method for realizing the control are not particularly limited.

In the aforementioned manner, the displacement data acquisition unit 111 acquires displacement data corresponding to the information processing device 10 and displacement data corresponding to the wearable terminal 30. Additionally, the displacement data acquisition unit 111 outputs the acquired displacement data respectively corresponding to the information processing device 10 and the wearable terminal 30 to the data interpolation unit 113.

(Data Interpolation Unit 113)

The data interpolation unit 113 acquires the displacement data corresponding to the information processing device 10 and the displacement data corresponding the wearable terminal 30 from the displacement data acquisition unit 111. The data interpolation unit 113 is a component for interpolating new sample data for the displacement data on the basis of detection results (which may be referred to as "sample data" hereinafter) included in the displacement data such that the displacement data corresponding to the information processing device 10 and the displacement data corresponding to the wearable terminal 30 may be compared with each other.

Specifically, sample data included in the displacement data corresponding to the information processing device 10 and the displacement data corresponding to the wearable terminal 30 is not necessarily acquired synchronously, and the numbers of pieces of sample data (which may be referred to as "the number of samples" hereinafter) are not necessarily equal. In other words, the displacement data respectively corresponding to the information processing device 10 and the displacement data corresponding to the wearable terminal 30 do not necessarily have the same sampling rate.

As a specific example, the performance of the sensor unit 13 of the information processing device 10 is not necessarily consistent with the performance of the sensor unit 33 of the wearable terminal 30. Accordingly, the number of samples acquired by one of the sensor units 13 and 33 in one second may be smaller than the number of samples acquired by the other in one second, for example.

In addition, various sensors constituting the sensor units 13 and 33 do not necessarily sequentially detect variations in the positions and orientations of the housings, and when the positions and orientations of the housings change, for example, the various sensors may be configured to detect the change. Accordingly, sample data is not necessarily acquired at a fixed timing as displacement data, and 10 pieces of sample data may be acquired for 0.1 seconds or no sample data may be acquired.

In this case, it may be difficult to compare the displacement data corresponding to the information processing device 10 and the displacement data corresponding to the wearable terminal 30. Accordingly, the data interpolation unit 113 interpolates new sample data for the displacement data on the basis of the sample data included in the displacement data.

As a specific example, the data interpolation unit 113 may perform, for example, an up-sampling process for displacement data having a lower sampling rate to adjust the sampling rate of the displacement data to displacement data having a higher sampling rate.

Meanwhile, a method of using polynomial interpolation represented by Lagrange's polynomial interpolation or the like may be considered as an example of a method of interpolating new sample data for existing displacement data. In this case, for example, the data interpolation unit 113 obtains a waveform (function) through which sample data included in displacement data is derived on the basis of the sample data and interpolates new sample data between the sample data included in the displacement data on the basis of the waveform.

Furthermore, as another example, the data interpolation unit 113 may model each piece of displacement data and interpolate different sample data for the displacement data before modeling on the basis of the modeled displacement data.

As a specific example of modeling, methods of using linear regression using a polynomial basis or a trigonometric polynomial basis, linear regression using a Kernel model, nonlinear regression using a neural network and the like may be considered. In this case, the data interpolation unit 113 obtains an approximate line on the basis of sample data included in the displacement data and interpolates new sample data between the sample data included in the displacement data on the basis of the approximate line, for example.

Further, the data interpolation unit 113 may model each piece of displacement data on the basis of the aforementioned method and acquire the modelled displacement data as new displacement data (i.e., sample data-interpolated displacement data). In this case, for example, the data interpolation unit 113 obtains an approximate line on the basis of the sample data included in the displacement data and acquires data on the approximate line as new sample data. In addition, the data interpolation unit 113 may define new displacement data on the basis of the acquired new sample data.

Incidentally, the aforementioned example is merely an example, and as long as new sample data may be interpolated for at least one of the displacement data corresponding to the information processing device 10 and the displacement data corresponding to the wearable terminal 30, the interpolation method is not necessarily limited to the aforementioned example.

In this manner, the data interpolation unit 113 performs the aforementioned process for interpolating sample data for one or both of the pieces of acquired displacement data and outputs the processed displacement data to the feature extraction unit 115.

(Feature Extraction Unit 115)

The feature extraction unit 115 acquires the displacement data corresponding to the information processing device 10 and the displacement data corresponding to the wearable terminal 30 from the data interpolation unit 113. The feature extraction unit 115 is a component for extracting feature values indicating features of sample data included in the displacement data from the acquired displacement data and generating feature-quantity vectors on the basis of the extracted feature values.

Specifically, it may be difficult to compare the acquired displacement data corresponding to the information processing device 10 and the displacement data corresponding to the wearable terminal 30 with each other as they are. In a specific example, a coordinate system on which the sensor unit 13 detects variations in the position and orientation of the information processing device 10 is not necessarily consistent with a coordinate system on which the sensor unit 33 indicates variations in the position and orientation of the wearable terminal 30. Furthermore, even in an absolute coordinate system, a direction in which the information processing device 10 is shaken is not necessarily consistent with a direction in which the wearable terminal 30 is shaken. Moreover, in the information processing device 10 and the wearable terminal 30, shaking widths and shaking directions during shaking may be different, in other words, change amounts in the positions and orientations of the housings and change directions may be different.

In addition, even if the user intentionally shakes the information processing device 10 and the wearable terminal 30 identically every time, respective operations are not necessarily precisely consistent with each other and there is no reproducibility in displacement data acquired on the basis of the operations. Furthermore, when the user shakes devices such as the information processing device 10 and the wearable terminal 30, directions in which the devices are shaken are different from each other if directions in which the user holds the devices are different from each other. Moreover, manners in which devices such as the information processing device 10 and the wearable terminal 30 are shaken may change depending on states in which the devices are held. In a specific example, when the wearable terminal 30 is not securely held on a wrist of the user, for example, if the user shakes the wearable terminal 30 by shaking his or her arm, the relative position of the wearable terminal 30 with respect to the wrist (e.g., the position or direction in which the wearable terminal 30 is held with respect to the wrist) may change in response to shaking. Accordingly, shaking of the wearable terminal 30 becomes more complicated because a random factor such as a change in the relative position of the wearable terminal 30 with respect to the wrist is added to shaking in the shaking direction of the arm.

In this case, when displacement data corresponding to the information processing device 10 and displacement data corresponding to the wearable terminal 30 are simply compared with each other, it may be difficult to determine whether the pieces of displacement data are similar. Further, when displacement data is applied to an identification function generated by a machine learning algorithm, it is generally known that identification performance is improved if the displacement data transformed into a feature-quantity vector that properly represents features of the displacement data is applied. Accordingly, the feature extraction unit 115 may extract feature values from the displacement data corresponding to the information processing device 10 and the displacement data corresponding to the wearable terminal 30 and transform the acquired displacement data into feature-quantity vectors based on the feature values. Here, the feature extraction unit 115 may transform the displacement data into feature-quantity vectors in a form that is easily processed by the determination unit 117 which will be described below (in other words, a form that may improve recognition accuracy of the determination unit 117). For example, when there is a deviation in the variance of change amount in each dimension (e.g., x-direction and y-direction) included in the displacement data, the feature extraction unit 115 may transform the displacement data into a feature-quantity vector in a form that is easily processed by the determination unit 117 by normalizing the change amounts in each dimension to alleviate the deviation in the variance.

In a more specific example, the feature extraction unit 115 may extract extreme values from the displacement data corresponding to the information processing device 10 and the displacement data corresponding to the wearable terminal 30 as feature values and arrange the extreme values in a time series time to generate feature-quantity vectors. In this way, it can be determined whether the displacement data corresponding to the information processing device 10 and the displacement data corresponding to the wearable terminal 30 are similar depending on whether timings at which respective extreme values in the displacement data corresponding to the information processing device 10 and the displacement data corresponding to the wearable terminal 30 are detected coincide with each other by generating the feature-quantity vectors based on the extracted extreme values.

Additionally, in another example, the feature extraction unit 115 may regard the displacement data when the information processing device 10 and the wearable terminal 30 are shaken as waveform data and generate the feature-quantity vectors using spectral information of waveforms of the waveform data as feature values. In a specific example, the feature extraction unit 115 may extract spectra from waveforms represented by the displacement data through regression according to a Fourier transform or on the basis of a trigonometric polynomial. For example, (Formula 1) shown below represents an example of a calculation formula when displacement data f(t) in a time series is transformed into a frequency function F(w) (i.e., transformed into spectral information) on the basis of a Fourier transform.

[Math. 1]

$$F(w) = \int_{-\infty}^{\infty} \overline{e^{iwt}} \cdot f(t) dt \quad \text{(Formula 1)}$$

In another example, the feature extraction unit 115 may extract a change amount indicated by each piece of sample data in each piece of displacement data as a feature value. In a specific example, the feature extraction unit 115 may extract a change amount along each axis of a so-called orthogonal coordinate system (e.g., a coordinate system defined by an X-axis, Y-axis and Z-axis) as feature values. In this case, the feature extraction unit 115 may extract a change amount for a predetermined reference point of each axis as a feature value. In another example, the feature extraction unit 115 may extract a change amount between pieces of sample data adjacent in the time series as a feature value.

In addition, when change amounts are extracted as feature values, the coordinate system is not necessarily limited to the orthogonal coordinate system. In a specific example, the feature extraction unit 115 may extract variations as feature values on the basis of a so-called polar coordinate system (e.g., a spherical coordinate system defined by a radius vector r and angles of deviation θ and φ).

In another example, the feature extraction unit 115 may extract variations in angles, instead of variations in distances in a predetermined coordinate system, as feature values, for example. For instance, the feature extraction unit 115 may define a vector in a predetermined coordinate system on the basis of the sample data included in the displacement data and extract an angle formed between the vector and each axis of the coordinate system as a feature value.

Furthermore, the feature extraction unit 115 may transform the displacement data in order to extract feature values. For example, when the sample data included in the displacement data is defined in a predetermined coordinate system, the feature extraction unit 115 may transform the sample data into data of a different coordinate system. In a specific example, the feature extraction unit 115 may transform each piece of sample data defined in the orthogonal coordinate system into sample data of the polar coordinate system through polar coordinate transformation. Of course, the feature extraction unit 115 may transform each piece of sample data defined in the polar coordinate system into sample data of the orthogonal coordinate system.

In addition, the feature extraction unit 115 may transform the displacement data into new displacement data based on a principal component of each piece of sample data included in the displacement data on the basis of principal component analysis (PCA). According to such transformation, the feature extraction unit 115 may transform sample data indicating change amounts along the x-axis, y-axis and z-axis (i.e., 3 axes) into a feature-quantity vector indicating a change amount along an axis representing the principal component (e.g., 1 axis) on the basis of the orthogonal coordinate system. Accordingly, processing load can be decreased according to determination of similarity between displacement data by the determination unit 117 which will be described below.

In another example, the feature extraction unit 115 may transform the displacement data corresponding to the information processing device 10 and the displacement data corresponding to the wearable terminal 30 into new different displacement data on the basis of canonical correlation analysis (CCA). In this case, the feature extraction unit 115 derives components having high correlation of change amounts between the sample data included in the displacement data corresponding to the information processing device 10 and the displacement data corresponding to the wearable terminal 30, for the respective displacement data, for example. Then, the feature extraction unit 115 may transform the respective displacement data into feature-quantity vectors based on the components derived for the displacement data.

In this way, feature-quantity vectors can be acquired using a direction having a larger variation as an axis for the information processing device 10 and the wearable terminal 30 by transforming the displacement data on the basis of PCA or CCA. Accordingly, even when a direction in which the user shakes the information processing device 10 and the wearable terminal 30 changes every time, for example, the axis of the shaking direction can be adjusted to a direction having a large variation between the information processing device 10 and the wearable terminal 30. That is, robustness against a difference between orientations in which the information processing device 10 and the wearable terminal 30 are held by the user and a difference between directions in which the devices are shaken can be achieved by transforming the displacement data on the basis of PCA or CCA.

In another example, the feature extraction unit 115 may accumulate displacement data when the information processing device 10 and the wearable terminal 30 are shaken as teacher data on the basis of machine learning and define a function for extracting feature values on the basis of the teacher data.

In a specific example, the feature extraction unit 115 analyzes shaking tendencies of the information processing device 10 and the wearable terminal 30 from the displacement data previously accumulated as the teacher data and extracts characteristic data on the basis of the analysis result. In addition, the feature extraction unit 115 derives a function for extracting the characteristic data from the displacement data on the basis of the displacement data accumulated as the teacher data and the extracted characteristic data.

The feature extraction unit 115 may transform the displacement data corresponding to the information processing device 10 and the displacement data corresponding to the wearable terminal 30, acquired from the data interpolation unit 113, into feature-quantity vectors by applying the function derived on the basis of the teacher data to the displacement data.

Meanwhile, the aforementioned examples are merely examples, and types of data extracted as feature values from the displacement data, methods of extracting the feature values and methods of transforming the displacement data are not necessarily limited to the above-described examples.

In this manner, the feature extraction unit 115 extracts feature values representing features of sample data included in the acquired displacement data corresponding to the information processing device 10 and the displacement data corresponding to the wearable terminal 30 from the displacement data and generates feature-quantity vectors based on the extracted feature values. When the acquired displacement data is transformed into the feature-quantity vectors in this way, even if a deviation is generated in the displacement data due to reproducibility of human motions, random factors (e.g., shaking caused by a device holding state) or the like, robustness against the deviation may be achieved.

In addition, the feature extraction unit 115 outputs the feature-quantity vectors corresponding to the information processing device 10 and the wearable terminal 30 to the determination unit 117.

(Determination Unit 117)

The determination unit 117 acquires the feature-quantity vectors corresponding to the information processing device 10 and the wearable terminal 30 from the feature extraction unit 115. Then, the determination unit 117 performs one or both of determination of whether the acquired feature-quantity vectors have unique features during shaking and determination of similarity between the feature-quantity vectors.

For example, when the determination unit 117 acquires spectral information as the feature-quantity vectors of the information processing device 10 and the wearable terminal 30, the determination unit 117 may determine whether the spectral information (i.e., frequency of shaking) is included in a predefined frequency band.

In a specific example, the user rarely shakes the wearable terminal 30 at over 2 Hz in daily life unless the user intentionally shakes a part of his or her body (e.g., an arm) on which be or she wears the wearable terminal 30. Further, it is difficult for the user to shake the body part on which be or she wears the wearable terminal 30 at over 3 Hz in many cases. Accordingly, the determination unit 117 may determine whether the spectral information of the information processing device 10 and the wearable terminal 30 is included in a hand of 2 Hz to 3 Hz, for example.

In addition, as long as similarity between the feature-quantity vectors corresponding to the information processing device 10 and the wearable terminal 30 may be determined, a method of determining the similarity is not particularly limited. For example, the determination unit 117 may determine the similarity on the basis of statistical indices between the feature-quantity vectors. A statistical distance, a correlation coefficient, the quantity of mutual information and the like may be considered as the statistical indices.

In a specific example, when the statistical distance is used, the determination unit 117 calculates the statistical distance by comparing corresponding elements included in the feature-quantity vectors with each other and accumulating a difference within relevant sample data. Then, the determination unit 117 determines the similarity depending on whether the calculated statistical distance exceeds a threshold value. In this case, when the statistical distance is equal to or lower than the threshold value, both pieces of displacement data may be considered to be similar, that is, shaking of the information processing device 10 and shaking of the wearable terminal 30 may be considered to be similar. When the statistical distance exceeds the threshold value, of course, the two pieces of displacement data may be considered to be dissimilar, that is, shaking of the information processing device 10 and shaking of the wearable terminal 30 may be considered to be dissimilar.

Furthermore, when the correlation function is used, as another example, the determination unit 117 calculates a correlation coefficient indicating a correlation between feature quantities by comparing corresponding elements included in the feature-quantity vectors with each other. Then, the determination unit 117 may determine the similarity depending on whether the calculated correlation coefficient exceeds a threshold value.

Moreover, when the quantity of mutual information is used, the determination unit 117 derives a simultaneous distribution function and a marginal probability distribution function of values of elements included in the respective feature-quantity vectors on the basis of the values of the elements included in the respective feature-quantity vectors. Then, the determination unit 117 may calculate the quantity of mutual information that indicates an index of mutual dependency between the elements of the respective feature-quantity vectors on the basis of the derived simultaneous distribution function and marginal probability distribution function and determine the similarity depending on whether the quantity of mutual information exceeds a threshold value.

In another example, the determination unit 117 may determine the similarity between the displacement data and determine whether the information processing device 10 and the wearable terminal 30 are shaking using an identification function generated by a machine learning algorithm. In this case, the determination unit 117 previously acquires and accumulates data used to determine the similarity between the displacement data corresponding to the information processing device 10 and the displacement data corresponding to the wearable terminal 30 and to determine whether the information processing device 10 and the wearable terminal 30 are shaken, as teacher data.

For example, the teacher data of the identification function used to determine the similarity includes displacement data indicating a typical example when shaking of the information processing device 10 and shaking of the wearable terminal 30 are similar and displacement data indicating a typical example when shaking of the information processing device 10 and shaking of the wearable terminal 30 are not similar, which have been previously acquired.

Specifically, the teacher data is generated by mapping a label of a correct result of determination of whether the displacement data corresponding to the information processing device 10 and the displacement data corresponding to the wearable terminal 30 are similar (i.e., information indicating whether the displacement data is similar). Of course, a set of displacement data series indicating that shaking of the information processing device 10 and shaking of the wearable terminal 30 are similar may be mapped to a label indicating that the displacement data is similar. Similarly, a set of displacement data series indicating that shaking of the information processing device 10 and shaking of the wearable terminal 30 are not similar may be mapped to a label indicating that the corresponding displacement data series are not similar.

Furthermore, the teacher data of the identification function used to determine whether vibration of the information processing device 10 and the wearable terminal 30 are shaken includes displacement data indicating a typical example when the information processing device 10 and the wearable terminal 30 are shaken and displacement data indicating a typical example when the information processing device 10 and the wearable terminal 30 are not shaken that are previously acquired, for example.

Specifically, the teacher data is generated by mapping a label of a correct result of determination of whether the displacement data corresponding to the information processing device 10 and the displacement data corresponding to the wearable terminal 30 are data when the information processing device 10 and the wearable terminal 30 are shaken (i.e., information indicating whether the information processing device 10 and the wearable terminal 30 are shaken). Of course, displacement data series indicating that the information processing device 10 and the wearable terminal 30 are shaken may be mapped to a label indicating that the displacement data series are shaken. Similarly, displacement data series indicating that the information processing device 10 and the wearable terminal 30 are not shaken may be mapped to a label indicating that the displacement data series are not shaken.

In addition, the determination unit 117 may realize determination of the similarity between the displacement data corresponding to the information processing device 10 and the displacement data corresponding to the wearable terminal 30, acquired from the feature extraction unit 115, and determination of whether the information processing device 10 and the wearable terminal 30 are shaken through comparison with the previously accumulated teacher data.

Meanwhile, as long as the determination unit 117 may determine the similarity between the pieces of displacement data on the basis of the previously accumulated teacher data, the determination method is not particularly limited. As a specific example of a learning algorithm, the determination unit 117 may determine the similarity between the pieces of displacement data on the basis of the previously accumulated teacher data and determine whether the information processing device 10 and the wearable terminal 30 are shaken depending on an identification function generated using a technology such as a linear support vector machine (SVM), a Kernel SVM or logistic regression. As an example of similarity determination using such identification functions, one feature-quantity vector may be derived according to connection of the feature-quantity vectors extracted from the information processing device 10 and the wearable terminal 30 and a difference therebetween and the derived feature-quantity vector may be input to the identification function. Further, two displacement data series may be made into one displacement data series through a difference between the two displacement data series or the sum thereof, and then one feature-quantity vector may be extracted and applied to the identification function.

For example, the determination unit 117 derives a boundary surface (so-called hyperplane) for classifying the feature-quantity vectors corresponding to the information processing device 10 and the wearable terminal 30 into classes indicating whether the feature-quantity vectors are similar on the basis of the technology called linear SVM. Then, the determination unit 117 determines which side of the derived boundary corresponds to the feature-quantity vectors corresponding to the information processing device 10 and the wearable terminal 30 to classify the feature-quantity vectors into any of the classes. The determination unit 117 may determine whether the displacement data corresponding to the information processing device 10 and the displacement data corresponding to the wearable terminal 30 are similar depending on a result of classification of a series of relevant sample data sets. Although determination of whether the feature-quantity vectors are similar has been described here, the same applies to determination of whether the information processing device 10 and the wearable terminal 30 are shaken).

Furthermore, the determination unit 177 may derive the boundary surface for classifying the feature-quantity vectors extracted in a time series from the displacement data corresponding to the information processing device 10 and the displacement data corresponding to the wearable terminal 30 as a complicated curved surface using the technology called Kernel SVM. That is, the determination unit 177 may classify the feature-quantity vectors extracted in the time series from the displacement data corresponding to the information processing device 10 and the displacement data corresponding to the wearable terminal 30 into the aforementioned classes with higher accuracy using the technology called Kernel SVM.

In addition, the determination unit 117 may learn posterior probabilities of classes to which the feature-quantity vectors extracted in the time series from the displacement data corresponding to the information processing device 10 and the displacement data corresponding to the wearable terminal 30 will be assigned on the basis of the technology called logistic regression. In this case, the determination unit 117 may classify the extracted feature-quantity vectors into a class having a maximum posterior probability.

Furthermore, the displacement data corresponding to the information processing device 10 and the displacement data corresponding to the wearable terminal 30 are not necessarily acquired in synchronization with each other, and one may be delayed with respect to the other. Accordingly, the determination unit 117 may shift (e.g., delay) one of the displacement data corresponding to the information processing device 10 and the displacement data corresponding to the wearable terminal 30 in a time series and then determine similarity between the pieces of displacement data. In this case, displacement data that becomes an object of similarity determination (i.e., displacement data after one of the pieces of displacement data has been shifted in the time series) corresponds to feature-quantity vectors.

Figure 7:
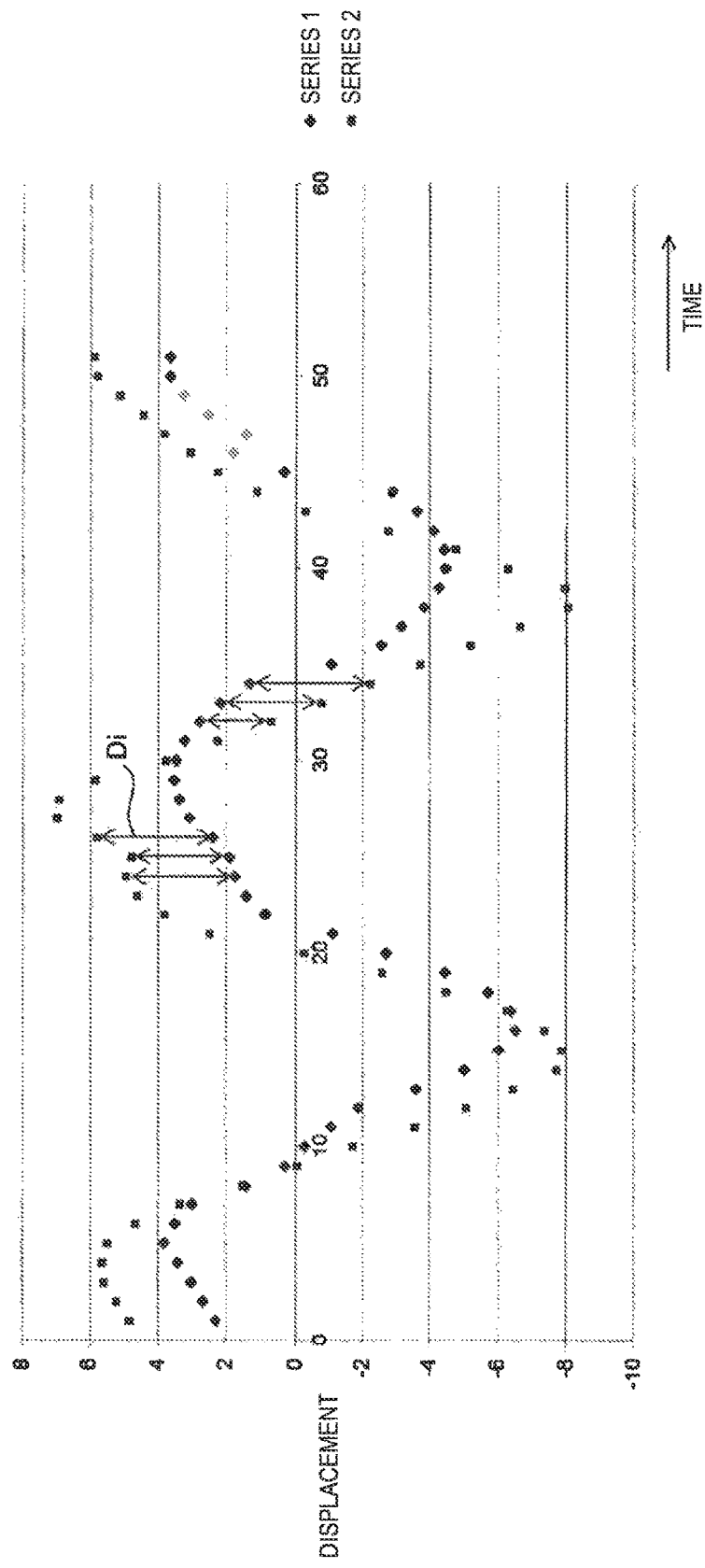
FIG. 7 is an explanatory diagram of an example of a method for shifting at least one of a plurality of different pieces of displacement data in a time series.
Figure 8:
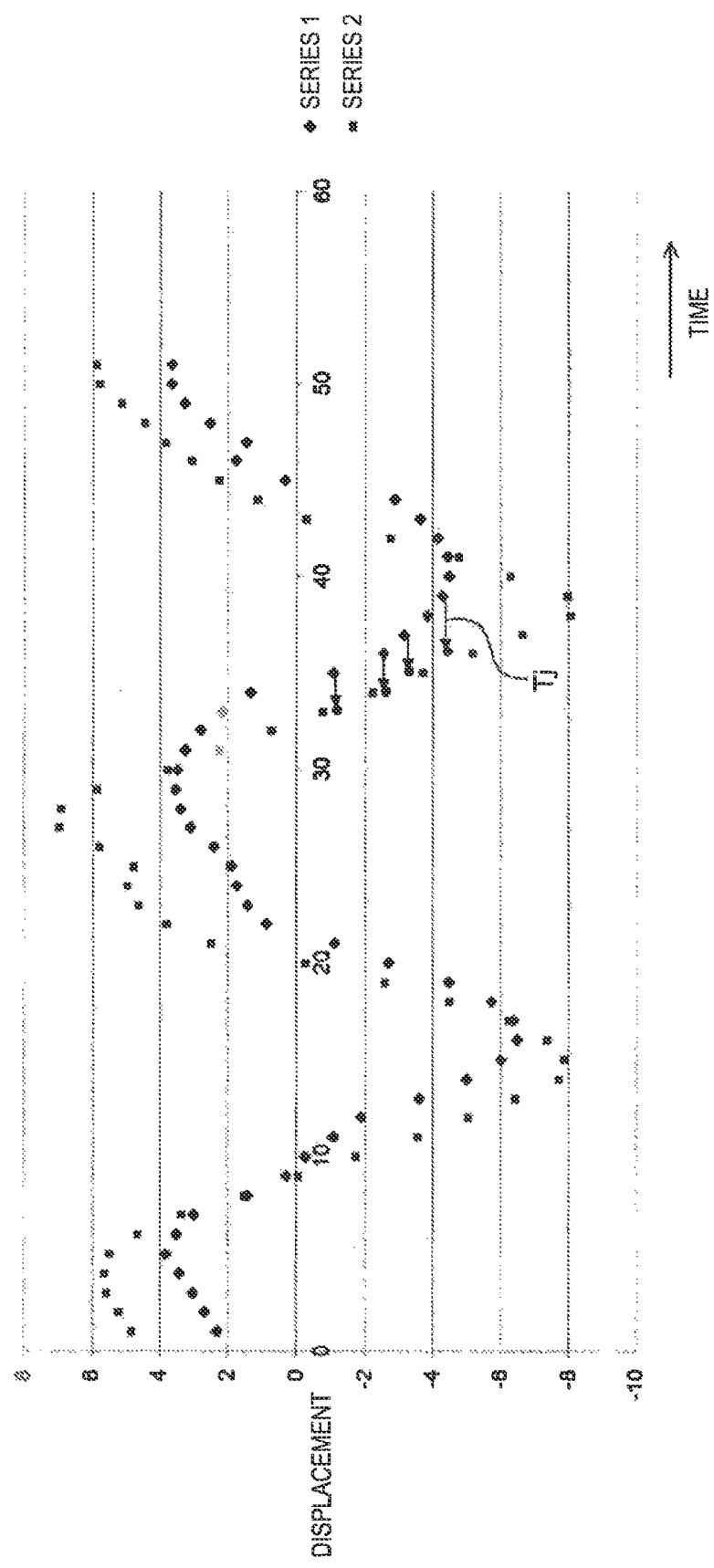
FIG. 8 is an explanatory diagram of an example of a method for shifting at least one of a plurality of different pieces of displacement data in a time series.

As a method of shifting at least one of the displacement data corresponding to the information processing device 10 and the displacement data corresponding to the wearable terminal 30 in the time series in this manner, a method called dynamic time warping may be considered. Accordingly, an overview of the method called dynamic time warping will be described hereinbelow as an example of a method of shifting at least one of the displacement data corresponding to the information processing device 10 and the displacement data corresponding to the wearable terminal 30 in the time series. FIGS. 7 and 8 are explanatory diagrams of an example of a method of shifting at least one of a plurality of different pieces of displacement data and the overview of the method called dynamic time warping. Further, FIGS. 7 and 8 illustrate an example of displacement data corresponding to the information processing device 10 and the displacement data corresponding to the wearable terminal 30, that is, data representing variations in a time series in at least one of the positions and orientations of the housings of the respective devices.

In FIGS. 7 and 8, the horizontal axis represents time as a relative value and the vertical axis represents displacement of the housing of each device (i.e., variations in at least one of the position and orientation) as a relative value. Furthermore, in FIGS. 7 and 8, sample data represented as series 1 indicates an example of sample data included in any one of the displacement data corresponding to the information processing device 10 and the displacement data corresponding to the wearable terminal 30. Sample data represented as series 2 indicates an example of sample data included in the other (displacement data on the side different from series 1) of the displacement data corresponding to the information processing device 10 and the displacement data corresponding to the wearable terminal 30.

When the method called dynamic time warping is used, the determination unit 117 calculates statistical distances between series 1 and series 2 by adding differences Di between the sample data of series 1 and sample data of series 2 in the time series, as illustrated in FIG. 7.

Subsequently, the determination unit 117 shifts sample data corresponding to at least one of series 1 and series 2 by a predetermined time width Tj in the time series, as illustrated in FIG. 8. Then, the determination unit 117 re-calculates statistical distances between series 1 and series 2 after shifting.

In this way, the determination unit 117 sequentially calculates the statistical distances between series 1 and series 2 while shifting the sample data corresponding to at least one of series 1 and series 2 in the time series. In addition, the determination unit 117 compares the calculated statistical distances, specifies a time width T corresponding to a minimum statistical distance and determines similarity between displacement data represented by series 1 and displacement data represented by series 2 (i.e., feature-quantity vectors) when shifted by the time width T.

In addition, when at least one of the displacement data corresponding to the information processing device 10 and the displacement data corresponding to the wearable terminal 30 is shifted (e.g., delayed) in the time series, a maximum value (in other words, a shift amount limit) of a shift amount (e.g., delay amount) may be set. In a specific example, when the maximum value of the shift amount is set to 10 seconds, the determination unit 117 shifts the displacement data in the time series within a range in which the time width is equal to or shorter than 10 seconds.

The aforementioned process according to determination of the similarity between the feature-quantity vectors by the determination unit 117 is a merely an example and thus as long as the similarity between the feature-quantity vectors corresponding to the information processing device 10 and the wearable terminal 30 may be quantitatively determined, the determination method is not particularly limited.

As described above, the determination unit 117 determines the similarity between the acquired feature-quantity vectors corresponding to the information processing device 10 and the wearable terminal 30. Then, the determination unit 117 cancels a predetermined restriction set by the so-called lock function when it is determined that corresponding displacement data is similar.

In this way, the controller 11 acquires the feature-quantity vectors (e.g., displacement data) corresponding to the information processing device 10 and the wearable terminal 30. Then, the controller 11 cancels the predetermined restriction set by the lock function on the basis of one or both of the result of comparison of similarity between the acquired feature-quantity vectors and the result of determination of whether the information processing device 10 and the wearable terminal 30 are shaken. Specifically, the controller 11 cancels the predetermined restriction set by the lock function when the displacement data corresponding to the information processing device 10 and the displacement data corresponding to the wearable terminal 30 are similar. Of course, the controller 11 does not cancel the restriction when the displacement data corresponding to the information processing device 10 and the displacement data corresponding to the wearable terminal 30 are not similar.

Furthermore, when it is determined that the displacement data is not similar, the controller 11 may acquire displacement data corresponding to the information processing device 10 and the displacement data corresponding to the wearable terminal 30 again and determine similarity between the pieces of displacement data again. Meanwhile, conditions on which the controller 11 acquires displacement data again and determines similarity between the pieces of displacement data may be appropriately set depending on operation. In a specific example, the controller 11 may acquire displacement data again and determine similarity between the pieces of displacement data if the number of determinations that the displacement data is not similar is equal to or less than a threshold value. Although determination of whether the feature-quantity vectors are similar has been described here, the same applies to determination of whether the information processing device 10 and the wearable terminal 30 are shaken.

Furthermore, the processing order of the data interpolation unit 113 and the feature extraction unit 115 is not necessarily limited to the aforementioned examples. In a specific example, the data interpolation unit 113 may interpolate new sample data for new displacement data generated by the feature extraction unit 115 on the basis of feature values indicating features of sample data included in the displacement data.

Moreover, one or both of the data interpolation unit 113 and the feature extraction unit 115 may not be operated. In a specific example, only interpolation of new sample data for acquired displacement data by the data interpolation unit 113 is performed, whereas extraction of feature values and generation of new displacement data based on the feature values by the feature extraction unit 115 are not performed. Similarly, only extraction of feature values by the feature extraction unit 115 on the basis of acquired displacement data and generation of new displacement data based on the feature values are performed, and interpolation of new sample data for displacement data by the data interpolation unit 113 may not be performed. Spectrum extraction according to the aforementioned regression using a trigonometric polynomial corresponds to this specific example. Of course, acquired displacement data may also be considered as feature values and directly compared to the displacement data to determine similarity of the displacement data without operating both the data interpolation unit 113 and the feature extraction unit 115. In other words, displacement data may correspond to an example of a feature-quantity vector.

An example of the functional configuration of the information processing system according to the present embodiment has been described with reference to FIG. 6.

Meanwhile, the functional configuration of the information processing system, described with reference to FIG. 6, is a merely an example and the present embodiment is not necessarily limited to the example illustrated in FIG. 6.

As a specific example, although the information processing device 10 performs various processes (i.e., processes corresponding to the respective components of the controller 11) for canceling the restriction by the lock function in the aforementioned examples, the subject of the processes is not necessarily limited to the information processing device 10. In a specific example, the wearable terminal 30 may perform various processes for canceling the restriction by the lock function. In this case, a component corresponding to the controller 11 of the information processing device 10 may be set in the wearable terminal 30, for example.

Here, the object of cancelation of the restriction by the lock function is not limited. For example, the wearable terminal 30 may cancel the restriction set in the information processing device 10 on the basis of feature-quantity vectors of the information processing device 10 and the wearable terminal 30. Similarly, the information processing device 10 may cancel the restriction set in the wearable terminal 30 on the basis of the feature-quantity vectors of the information processing device 10 and the wearable terminal 30.

In addition, the subject of instructing cancelation of the restriction by the lock function is not particularly limited. As a specific example, the information processing device 10 may be instructed by the wearable terminal 30 to perform various processes for canceling the restriction by the lock function. Similarly, the wearable terminal 30 may be instructed by the information processing device 10 to perform various processes for canceling the restriction by the lock function.

Furthermore, when the restriction by the lock function has been canceled, the controller 11 of the information processing device 10 may notify the wearable terminal 30 of the cancelation. In this case, the wearable terminal 30 may receive the notification from the controller 11 and notify the user that the restriction set by the lock function for the information processing device 10 has been canceled. According to such configurations, when the restriction of the information processing device 10 is illegally canceled by a third person, the user (owner) of the information processing device 10 may sense the illegal cancelation.

Meanwhile, the method of notifying information by the wearable terminal 30 on the basis of the notification from the controller 11 is not particularly limited. For example, the wearable terminal 30 may notify the user of information by vibrating an actuator set therein. As another example, the wearable terminal 30 may notify of information by causing an LED set therein to emit light in a predetermined form (e.g., an emitting pattern or emitting color). Of course, the wearable terminal 30 may notify of information through the UI 35 (specifically the display unit 353).

Moreover, the aforementioned restriction cancelation operation by the controller 11 on the basis of the feature-quantity vectors of the information processing device 10 and the wearable terminal 30 (which may be referred to hereinafter as a "restriction cancelation operation based on feature-quantity vectors") may be temporarily stopped and the stopped operation may be resumed.

In a specific example, the controller 11 may temporarily stop the restriction cancelation operation based on feature-quantity vectors on the basis of an instruction of the user through the UI 15 of the information processing device 10 or the UI 35 of the wearable terminal 30. Of course, the controller 11 may resume the stopped operation on the basis of an instruction of the user through the UI 15 of the information processing device 10 or the UI 35 of the wearable terminal 30.

In addition, as another example, the controller 11 may temporarily stop the restriction cancelation operation based on feature-quantity vectors when a state in which a change amount in shaking of at least one of the information processing device 10 and the wearable terminal 30 is equal to or lower than a threshold value (e.g, the device is set down) persists for a predetermined time or longer. In this case, the controller 11 may temporarily stop the restriction cancelation operation based on feature-quantity vectors, for example, when the average of change amounts within a predetermined time in a feature-quantity vector (e.g., displacement data) of a target device is equal to or lower than a predetermined threshold value.

In another example, the controller 11 may perform the restriction cancelation operation based on feature-quantity vectors until a predetermined time elapses from when the restriction is set by the lock function and temporarily stop the restriction cancelation operation based on feature-quantity vectors after the lapse of the predetermined time. According to such configurations, even when the lock function is automatically executed according to setting for power reduction to set a restriction for the information processing device 10 while the user uses the information processing device 10, for example, the user may cancel the restriction again through a simple procedure.

3. PROCESSING

Figure 9:
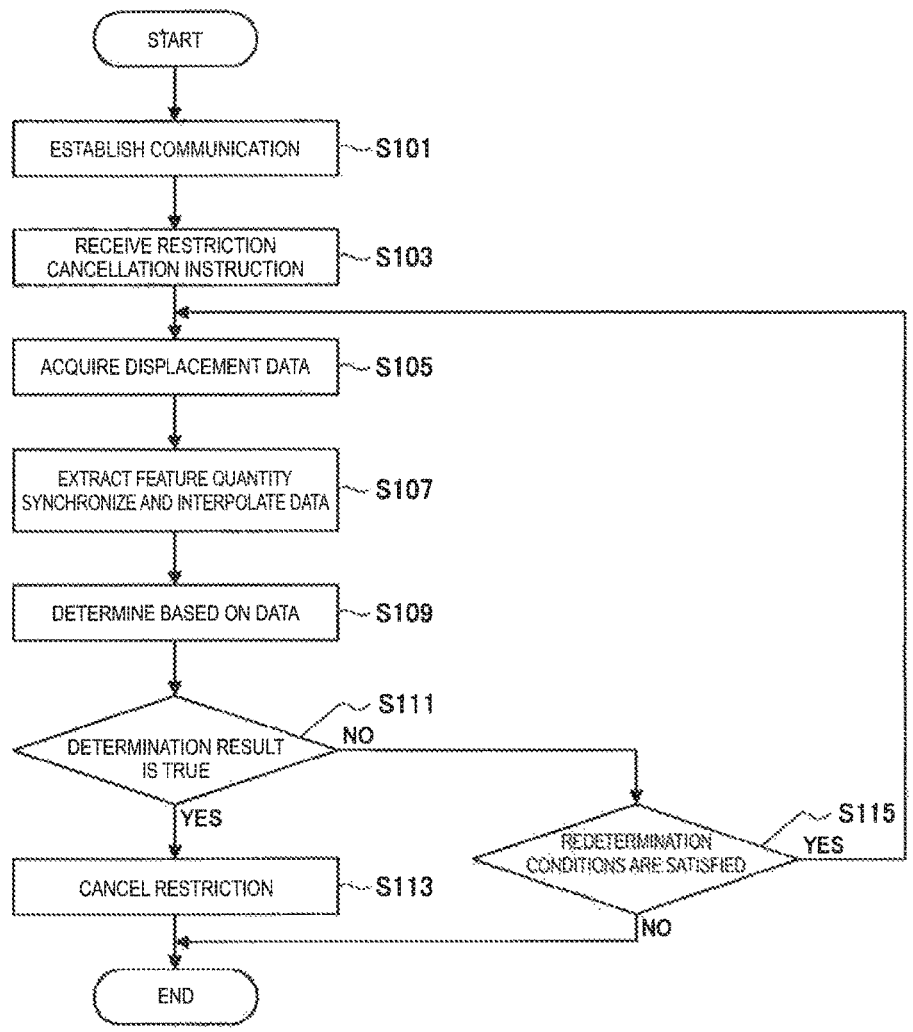
FIG. 9 is a flowchart illustrating an example of a flow of a series of processes of the information processing system according to the embodiment.

Next, an example of a flow of a series of processes of the information processing system according to the present embodiment, particularly, processes of the information processing device 10, will be described with reference to FIG. 9. FIG. 9 is a flowchart illustrating an example of a flow of a series of processes of the information processing system according to the present embodiment.

(Step S101)

First, when communication with the wearable terminal 30 through the network n1 is not established, the communication unit 17 of the information processing device 10 establishes communication with the wearable terminal 30 through the network n1 by executing a predetermined communication sequence.

At this time, when the wearable terminal 30 is not registered as a communication partner, the communication unit 17 may register the wearable terminal 30 as a communication partner by executing a predetermined procedure such as key exchange with the wearable terminal 30.

As a procedure for registering the wearable terminal 30 by the communication unit 17 as a communication partner, pairing based on the Bluetooth (registered trademark) standard, Wi-Fi protected setup based on the Wi-Fi (registered trademark) standard or the like may be considered, for example. Further, the communication unit 17 may register the wearable terminal 30 as a communication partner by performing mutual authentication with the wearable terminal 30 through an authentication method using a common key such as the advanced encryption standard (AES) or an authentication method using a public key such as RSA, MQ or the like. Of course, the procedure for registering the wearable terminal 30 by the communication unit 17 as a communication partner may not necessarily be performed through the network n1. In a specific example, the communication unit 17 may perform the procedure for registering the wearable terminal 30 as a communication partner via a network, different from the network n1, such as the Internet.

(Steps S103 and S105)

When an instruction from the user is received through the UI 15 (step S103), the displacement data acquisition unit 111 acquires information indicating variations in a time series in at least one of the position and orientation of the housing of the information processing device 10, output from the sensor unit 13, as displacement data (step S105).

In addition, the displacement data acquisition unit 111 acquires displacement data indicating variations in a time series in at least one of the position and orientation of the housing of the wearable terminal 30 from the wearable terminal 30 through the network n1 (step S105). At this time, the displacement data acquisition unit 111 may instruct the wearable terminal 30 to transmit the displacement data. As another example, the displacement data acquisition unit 111 may passively wait for transmission of the displacement data from the wearable terminal 30.

As described above, the displacement data acquisition unit 111 acquires displacement data corresponding to the information processing device 10 and displacement data corresponding to the wearable terminal 30. In addition, the displacement data acquisition unit 111 outputs the acquired displacement data corresponding to the information processing device 10 and displacement data corresponding to the wearable terminal 30 to the data interpolation unit 113.

(Step S107)

The data interpolation unit 113 acquires the displacement data corresponding to the information processing device 10 and the displacement data corresponding to the wearable terminal 30 from the displacement data acquisition unit 111. The data interpolation unit 113 interpolates new sample data for the displacement data on the basis of sample data included in the displacement data such that the displacement data corresponding to the information processing device 10 and the displacement data corresponding to the wearable terminal 30 may be compared with each other. Incidentally, the method of interpolating the new sample data for the displacement data has been described above and thus detailed description is omitted here.

Then, the data interpolation unit 113 outputs the displacement data corresponding to the information processing device 10 and the displacement data corresponding to the wearable terminal 30, on which the process of interpolating the sample data has been performed, to the feature extraction unit 115.

The feature extraction unit 115 acquires the displacement data corresponding to the information processing device 10 and the displacement data corresponding to the wearable terminal 30 from the data interpolation unit 113. The feature extraction unit 115 extracts feature values indicating features of sample data included in the displacement data from the acquired displacement data and generates feature-quantity vectors based on the extracted feature values. Incidentally, the method of generating the feature-quantity vectors on the basis of the feature values indicating the features of the sample data included in the displacement data has been described above and thus detailed description is omitted here.

Then, the feature extraction unit 115 outputs the feature-quantity vectors corresponding to the information processing device 10 and the wearable terminal 30 to the determination unit 117.

(Step S109)

The determination unit 117 acquires the feature-quantity vectors corresponding to the information processing device 10 and the wearable terminal 30 from the feature extraction unit 115 and compares the acquired feature-quantity vectors with each other to determine similarity therebetween. In addition, the determination unit 117 may determine whether both the information processing device 10 and the wearable terminal 30 are shaken on the basis of the acquired feature-quantity vectors. Of course, the determination unit 117 may perform both determination of similarity between the acquired feature-quantity vectors and determination of whether the information processing device 10 and the wearable terminal 30 are shaken. Incidentally, the method of determining similarity between the acquired feature-quantity vectors and the method of determining whether the information processing device 10 and the wearable terminal 30 are shaken have been described above and thus detailed description is omitted here.

(Step S113)

The determination unit 117 cancels a predetermined restriction set by a so-called lock function when it is determined that the corresponding displacement data is similar (step S111, YES) on the basis of the result of comparison of similarity between the feature-quantity vectors corresponding to the information processing device 10 and the wearable terminal 30. Similarly, the determination unit 117 cancels the predetermined restriction set by the so-called lock function when it is determined that both the information processing device 10 and the wearable terminal 30 are shaken (step S111, YES). In this way, the determination unit 117 cancels the predetermined restriction set by the lock function when the result of an executed determination is true.

(Step S115)

Of course, the controller 11 may not cancel the restriction when the feature-quantity vectors corresponding to the information processing device 10 and the wearable terminal 30 are not similar (step S111, NO). Similarly, the controller 11 may not cancel the restriction when it is determined that both the information processing device 10 and the wearable terminal 30 are not shaken (step S111, NO). In this way, the determination unit 117 cancels the predetermined restriction set by the lock function when the result of an executed determination is false.

Meanwhile, when predefined redetermination conditions are satisfied (step S115, YES), the controller 11 may acquire displacement data corresponding to the information processing device 10 and displacement data corresponding to the wearable terminal 30 and re-determine similarity between the pieces of displacement data. This is the same in determination of whether the information processing device 10 and the wearable terminal 30 are shaken. Of course, the controller 11 may terminate a series of processes according to restriction cancelation when the redetermination conditions are not satisfied (step S115, NO).

An example of a flow of a series of processes of the information processing system according to the present embodiment, particularly, the processes of the information processing device 10, have been described with reference to FIG. 9.

4. MODIFICATION EXAMPLES

Next, modification examples of the information processing system according to the present disclosure will be described.

4.1. Modification Example 1: Example of Use Pattern

First, an example of a use pattern of the information processing system according to the present embodiment will be described as modification example 1. In the aforementioned embodiment, a case in which the user cancels a predetermined restriction set in the information processing device 10 by shaking both the information processing device 10 and the wearable terminal 30 while gripping the information processing device 10 with a hand on which be or she wears the wearable terminal 30 has been described.

On the other hand, when the restriction set in the information processing device 10 is canceled, different users may hold the information processing device 10 and the wearable terminal 30 and cancel the restriction by shaking the devices that they hold.

Figure 10:
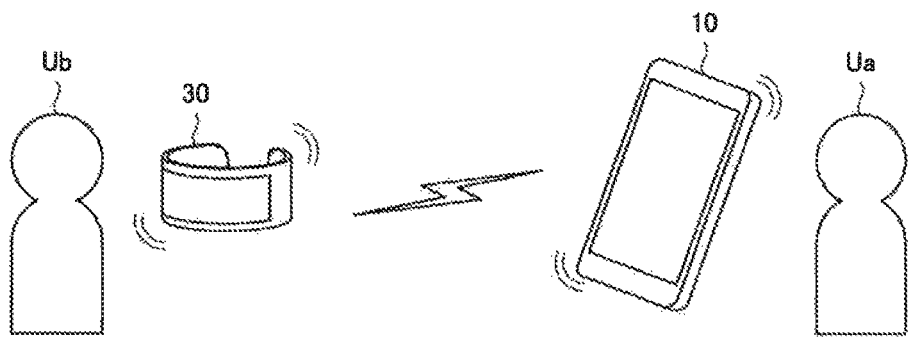
FIG. 10 is an explanatory diagram of an overview of an information processing system according to modification example 1.

For example, FIG. 10 is an explanatory diagram of an overview of an information processing system according to modification example 1. In the example shown in FIG. 10, a user Ua holds the information processing device 10 and a user Ub holds the wearable terminal 30. Here, the user Ua may cancel a predetermined restriction set in the information processing device 10 by shaking the information processing device 10 that be or she holds in accordance with an operation of the user Ub shaking the wearable terminal 30.

Further, since the information processing device 10 and the wearable terminal 30 are shaken by different users in the example shown in FIG. 10, shaking of the information processing device 10 is not precisely consistent with shaking of the wearable terminal 30 and shaking of one side may be delayed with respect to shaking of the other side as in the embodiment described above with reference to FIG. 5. While such effects may appear in a case in which one user shakes the information processing device 10 and the wearable terminal 30 with different hands, the effects tend to become remarkably apparent when the devices are shaken by different users, as illustrated in FIG. 10.

Accordingly, in the information processing system according to modification example 1, the information processing device 10 may set the threshold value to be lower than in the aforementioned embodiment (example shown in FIG. 5) when similarity between displacement data corresponding to the information processing device 10 and displacement data corresponding to the wearable terminal 30 is determined. According to such a configuration, the information processing device 10 may permit an error between shakings, generated when the information processing device 10 and the wearable terminal 30 are shaken by different users, and cancel a predetermined restriction.

When the threshold value used to determine similarity between displacement data is set to be lower in this way, robustness against an error between pieces of displacement data (i.e., an error between shaking of the information processing device 10 and shaking of the wearable terminal 30) is improved.

On the other hand, when the threshold value is set to be lower, a probability of restriction cancelation at a timing that is not intended by the user increases as the threshold value is set to be lower because the error between displacement data is further permitted. Accordingly, it is desirable that the threshold value used to determine similarity between displacement data be appropriately set on the basis of prior experiment results or the like depending on a considered use pattern.

Similarly, in determination of similarity between the displacement data in the information processing system according to modification example 1, when at least one piece of displacement data is shifted in a time series, the maximum value of the shift amount may be set to be higher than that in the aforementioned embodiment (example shown in FIG. 5). According to such a configuration, even if the information processing device 10 and the wearable terminal 30 are shaken by different users and thus shaking of one device is delayed with respect to shaking of the other device, the information processing device 10 may permit the delay and cancel a predetermined restriction.

When the maximum value of the shift amount when displacement data is shifted in the times series is set to be higher in this manner, robustness against an error between the displacement data generated due to delay of shaking of one device with respect to shaking of the other device is improved. Accordingly, even in a situation such as when delay is generated in communication between the information processing device 10 and the wearable terminal 30, for example, the information processing device 10 may permit the delay involved in communication and cancel a restriction by setting the maximum value of the shift amount to be higher.

Further, when the maximum value of the shift amount is set to be higher, an error between pieces of displacement data is further permitted and thus probability of restriction cancelation at a timing that is not intended by the user increases as the maximum value of the shift amount is set to be higher. Accordingly, the maximum value of the shift amount when displacement data is shifted in the time series may be appropriately set on the basis of prior experiment results depending on a considered user pattern.

In this way, the threshold value for determining similarity between pieces of displacement data and the shift amount when displacement data is shifted in the time series may be appropriately adjusted in accordance with a use pattern of the information processing system. Accordingly, the user Ua may cancel the restriction of the information processing device 10 by shaking the information processing device 10 that be or she holds in accordance with an operation of the user Ub shaking the wearable terminal 30 as in the example illustrated in FIG. 10, for example.

4.2. Modification Example 2: Example of System Configuration

Figure 11:
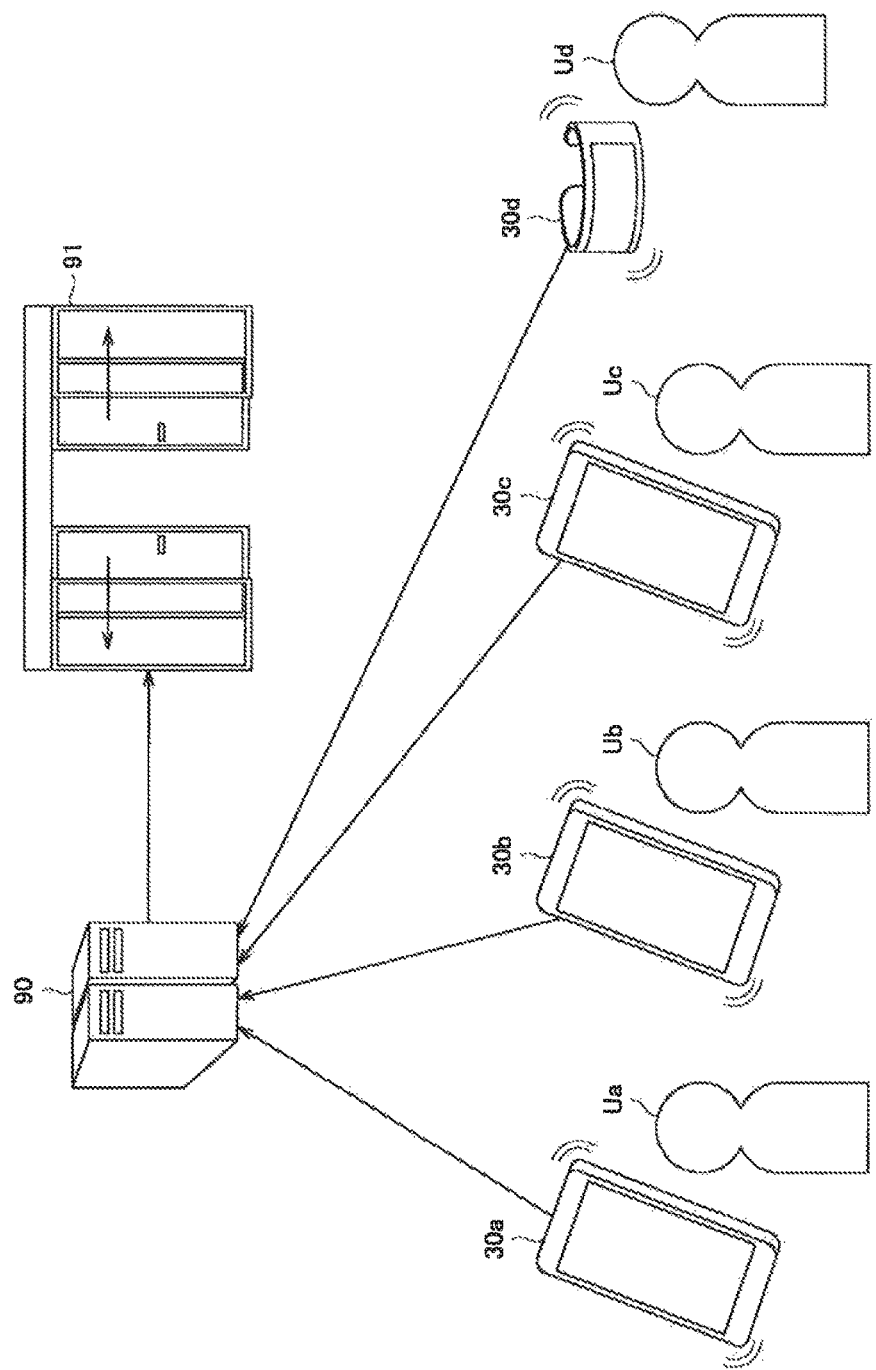
FIG. 11 is an explanatory diagram of an overview of an information processing system according to modification example 2.

Next, an example of a system configuration of the information processing system according to the present embodiment will be described as modification example 2 with reference to FIG. 11. FIG. 11 is an explanatory diagram of an overview of an information processing system according to modification example 2.

In the aforementioned embodiment, the information processing device 10 compares displacement data based on shaking of the information processing device 10 with displacement data based on shaking of the wearable terminal 30 one-to-one to determine similarity between the pieces of displacement data and cancels a predetermined restriction in response to the determination result. In contrast, modification example 2 describes an example in which the number of devices shaken when a restriction is canceled is increased to a number greater than 2.

As shown in FIG. 11, the information processing system according to modification example 2 includes a server 90 and information processing terminals 30a to 30d. Further, the information processing terminals 30a to 30d are held by different users Ua to Ud in the example shown in FIG. 11. In addition, the server 90 is set to a subject of canceling a predetermined restriction and controls restriction cancelation (i.e., lock cancelation) of a security gate 91 in the example shown in FIG. 11.

Specifically, when the users Ua to Ud shake the information processing terminals 30a to 30d that they hold, the information processing terminals 30a to 30d sequentially sense at least one of the positions and orientations of the housings thereof. Then, the information processing terminals 30a to 30d transmit information indicating variations in time series in at least one of the positions and orientations of the housings to the server 90 as displacement data.

When the server 90 acquires the displacement data from the information processing terminals 30a to 30d, the server 90 performs one or both of determination of similarity between the acquired pieces of displacement data (in other words, feature-quantity vectors) through comparison of the displacement data and determination of whether the acquired displacement data has features indicating shaking. At this time, the server 90 may interpolate new sample data for the acquired displacement data like the information processing device 10 according to the aforementioned embodiment. Furthermore, the server 90 may extract feature values indicating features of sample data included in the acquired displacement data and generate new displacement data based on the extracted feature values, like the information processing device 10 according to the aforementioned embodiment.

Then, the server 90 cancels the restriction (e.g., lock) of the security gate 91 when it is determined that the displacement data acquired from the information processing terminals 30a to 30d is similar.

As long as the number of devices shaken by users when a predetermined restriction is canceled (i.e., devices sensing shaking of housings and outputting displacement data), such as the information processing terminals 30a to 30d illustrated in FIG. 11, is equal to or greater than 2, the number of devices is not particularly limited.

Meanwhile, as the number of devices shaken by a user (e.g., information processing terminals 30a to 30d) increases, a probability of having precisely the same shaking of the devices tends to decrease and an error between shaking patterns of the devices tends to increase. Accordingly, a threshold value used for the server 90 to determine similarity between feature-quantity vectors (e.g., displacement data) corresponding to the devices may be appropriately set on the basis of prior experiment results or the like in response to the number of devices shaken by users, for example.

In addition, the server 90 may dynamically change the threshold value for determining similarity between feature-quantity vectors corresponding to devices in response to the number of devices shaken by users. In this case, it is desirable that the server 90 change the threshold value such that robustness is improved (e.g., the threshold value decreases) as the number of devices shaken by users increases, for example.

Similarly, a probability of precise synchronization of shaking of the devices decreases as the number of devices shaken by users increases. Accordingly; it is desirable that a maximum value of a shift amount when the server 90 shifts displacement data in a time series be appropriately set on the basis of prior experiment results or the like in response to the number of devices shaken by users.

In addition, the server 90 may dynamically change the maximum value of the shift amount when the server 90 shifts displacement data in the time series in response to the number of devices shaken by users. In this case, it is desirable that the server 90 change the maximum value, for example, such that robustness is improved (e.g., the maximum value of the shift amount further increases) as the number of devices shaken by users increases.

Furthermore, a device that determines similarity among a plurality of feature-quantity vectors to cancel a restriction and devices shaken by users (i.e., devices sensing shaking of the housings and output displacement data) as in the relationship among the server 90 and the information processing terminals 30a to 30d illustrated in FIG. 11, may be configured as different devices. Of course, any of devices shaken by users may be configured to determine similarity among a plurality of feature-quantity vectors to cancel a restriction as in the information processing system according to the aforementioned embodiment (e.g., FIGS. 5 and 6).

Meanwhile, it is desirable that the server 90 be connected to the information processing terminals 30a to 30d via a network in the case of the example shown in FIG. 11, and the information processing terminals 30a to 30d may not necessarily be connected through the network. In this case, the respective information processing terminals 30a to 30d are registered as communication partners of the server 90. That is, the server 90 recognizes the respective information processing terminals 30a to 30d as communication partners and thus the information processing terminals 30a to 30d are indirectly associated.

In addition, a subject of cancelation of a predetermined restriction and an object of cancelation of the restriction may be configured as different devices, as in the relationship between the server 90 and the security gate 91 illustrated in FIG. 11. Of course, the subject of cancelation of the predetermined restriction and the object of cancelation of the restriction may be set in the same device as in the information processing system according to the aforementioned embodiment (e.g., FIGS. 5 and 6).

As modification example 2, the example in which the number of devices shaken when a restriction is canceled is increased to a number greater than 2 has been described as an example of the system configuration of the information processing system according to the present embodiment with reference to FIG. 11

4.3. Modification Example 3: Control Example According to Restriction Cancelation Next, an example of control according to restriction cancelation in the information processing system according to the present embodiment will be described as modification example 3.

In the information processing system according to the aforementioned embodiment, displacement data when the information processing device 10 and the wearable terminal 30 are shaken is regarded as waveform data and feature-quantity vectors are generated using spectral information of waveforms of the waveform data as feature values. Specifically, in the information processing system according to the aforementioned embodiment, spectra are extracted from waveforms represented by displacement data detected from the information processing device 10 and the wearable terminal 30 through a Fourier transform or regression on the basis of a trigonometric polynomial, for example. In this way, the information processing system according to the aforementioned embodiment performs determination for restriction cancelation for results of detection of periodic motions of the user (in other words, motions having small time variations of frequency), which are detected from the information processing device 10 and the wearable terminal 30.

In contrast, modification example 3 describes an example of control according to restriction cancelation in the information processing system according to the present embodiment when determination for restriction cancelation is performed for results of detection of instantaneous motions of the user (in other words, motions having large time variations of frequency). In the present disclosure, parts different from the information processing system according to the aforementioned embodiment, particularly operations of the feature extraction unit 115 and the determination unit 117 are described and detailed description of other components is omitted.

(Feature Extraction Unit 115)

In an information processing system according to modification example 3, the feature extraction unit 115 detects large instantaneous variations in the positions and orientations (which may be referred to as "instantaneous motions") within a predetermined time from acquired displacement data corresponding to the information processing device 10 and displacement data corresponding to the wearable terminal 30. At this time, when an instantaneous motion is detected only from one of the information processing device 10 and the wearable terminal 30 (i.e., when an instantaneous motion is not detected from the other), the following processing is not performed and restriction cancelation is not carried out.

When instantaneous motions are detected from the displacement data corresponding to the information processing device 10 and the displacement data corresponding to the wearable terminal 30, the feature extraction unit 115 extracts data corresponding to a predetermined time width including timing at which the motions are detected from the corresponding displacement data. In a specific example, the feature extraction unit 115 extracts data corresponding to a predetermined number of seconds before and after the timing at which the instantaneous motions are detected from the corresponding displacement data.

Subsequently, the feature extraction unit 115 performs wavelet analysis for the data corresponding to the predetermined time width extracted from the displacement data (i.e., wavelet-transforms the data) to extract feature quantities from the data corresponding to the predetermined time width as a result of the wavelet analysis. Hereinafter, a feature quantity extracted on the basis of wavelet analysis may be referred to as a "wavelet feature."

Here, an overview of wavelet analysis will be described. Wavelet analysis corresponds to a process of shifting a mother wavelet ψ(t) from displacement data f(t) in time series (i.e., extracted data corresponding to a predetermined width) to extract a component extended by a in the time direction as a wavelet feature W (a, b) for (a, b). As a specific example, the wavelet feature W(a, b) is calculated on the basis of (Formula 2) shown below.

[Math. 2]

$$W(a, b) = \int_{-\infty}^{\infty} \sqrt{\frac{1}{|a|}} \cdot \psi\left(\frac{t-b}{a}\right) \cdot f(t) dt \quad \text{(Formula 2)}$$

Figure 13:
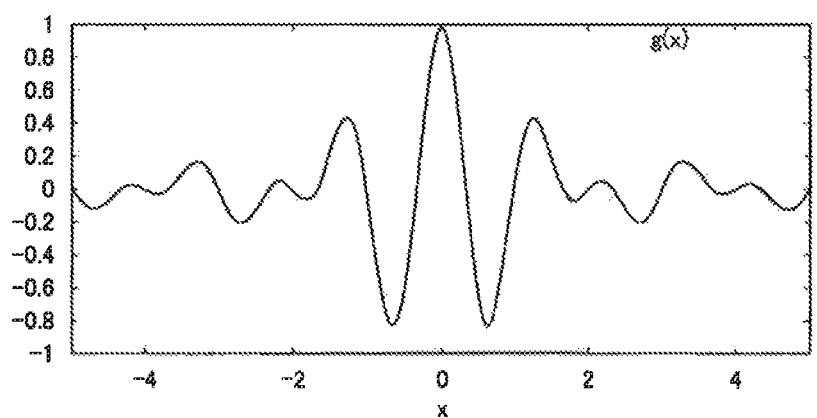
FIG. 13 is a diagram illustrating an example of a mother wavelet.
Figure 14:
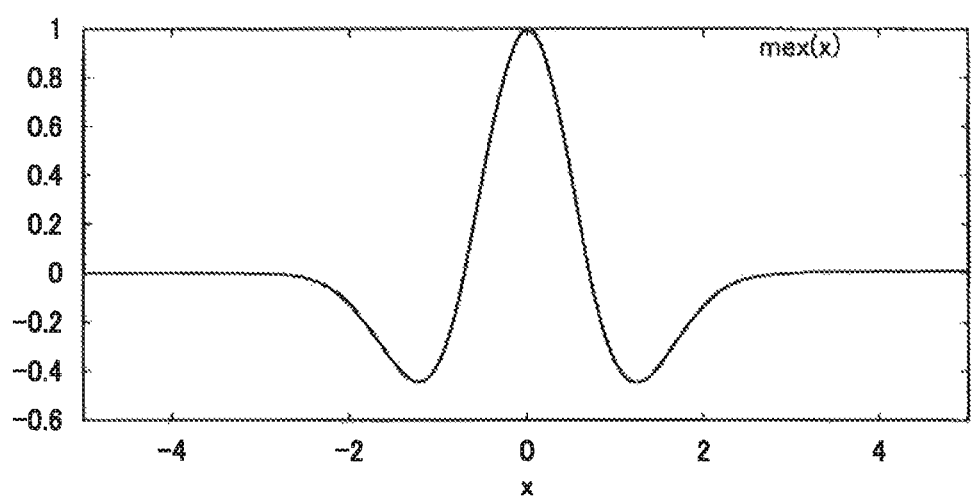
FIG. 14 is a diagram illustrating an example of a mother wavelet.

Meanwhile, data used as the mother wavelet ψ(t) is not particularly limited. For example, FIGS. 13 and 14 are diagrams illustrating examples of mother wavelets ψ(t). FIG. 13 is an example of a mother wavelet ψ(t) called a "Shannon wavelet" and FIG. 14 is an example of a mother wavelet ψ(t) called a "Mexican hat." Further, "Daubechies wavelet," "Meyer wavelet," "Gabor wavelet" and the like may be considered as other examples of the mother wavelet ψ(t).

In the aforementioned manner, the feature extraction unit 115 extracts wavelet features W(a, b) from the displacement data of the information processing device 10 and the wearable terminal 30 and generates feature-quantity vectors using the extracted wavelet features W(a, b) as feature values. Then, the feature extraction unit 115 outputs the feature-quantity vectors generated for the information processing device 10 and the wearable terminal 30 to the determination unit 117.

Although the aforementioned example describes a case in which the feature extraction unit 115 of the information processing device 10 extracts the wavelet features W(a, b) from the displacement data of the information processing device 10 and the wearable terminal 30 and generates the feature-quantity vectors, the configuration is not necessarily limited thereto. In a specific example, the information processing device 10 and the wearable terminal 30 may each extract wavelet features W(a, b) from the displacement data. In this case, when a wavelet feature W(a, b) is extracted from displacement data (i.e., when an instantaneous motion is detected), the wearable terminal 30 may generate a feature-quantity vector on the basis of the extracted wavelet feature W(a, b) and transmit the feature-quantity vector to the information processing device 10.

(Determination Unit 117)

The determination unit 117 acquires the feature-quantity vectors generated for the information processing device 10 and the wearable terminal 30 (i.e., feature-quantity vectors generated using the wavelet features W(a, b) as feature values) from the feature extraction unit 115. Then, the determination unit 117 determines whether to cancel a predetermined restriction set by the so-called lock function on the basis of the feature-quantity vectors acquired for the information processing device 10 and the wearable terminal 30.

At this time, the determination unit 117 may determine whether to cancel the predetermined restriction on the basis of similarity between the feature-quantity vectors corresponding to the information processing device 10 and the wearable terminal 30 as in the case of the information processing system according to the aforementioned embodiment.

In another example, the determination unit 117 may determine whether to cancel the predetermined restriction by performing predetermined identification processes for the feature-quantity vectors of the information processing device 10 and the wearable terminal 30 and comparing results of the identification processes.

Figure 15:
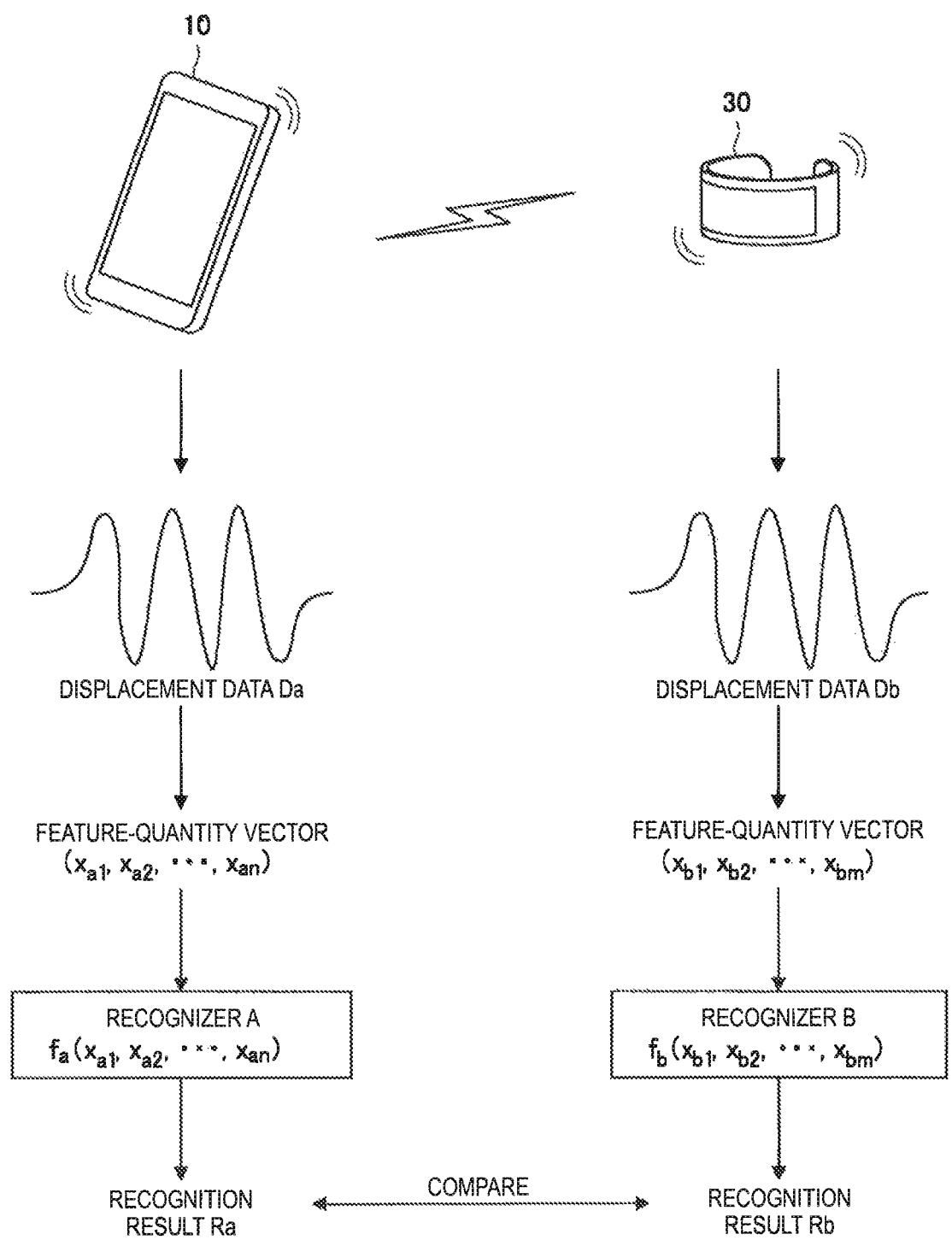
FIG. 15 is an explanatory diagram of an example of approximate control according to restriction cancelation in an information processing system according to modification example 3.

For example, FIG. 15 is an explanatory diagram of an example of approximate control according to restriction cancelation in the information processing system according to modification example 3.

In the example shown in FIG. 15, the determination unit 117 inputs a feature-quantity vector $(x_{a1}, x_{a2}, \ldots, x_{an})$ generated on the basis of displacement data Da corresponding to the information processing device 10 to a recognizer A. The recognizer A recognizes whether the input feature-quantity vector is a feature-quantity vector indicating a feature of a predetermined motion on the basis of an identification function $f_a(x_{a1}, x_{a2}, \ldots, x_{an})$ generated using a technology such as SMV, boosting, logistic regression or the like and outputs a recognition result Ra. As a specific example of the predetermined motion, a motion of the information processing device 10 when the user twists a hand holding the information processing device 10 may be considered. Of course, the motion is merely an example and is not limited thereto.

Similarly, the determination unit 117 inputs a feature-quantity vector $(x_{b1}, x_{b2} \ldots, x_{bm})$ generated on the basis of displacement data Db corresponding to the wearable terminal 30 to a recognizer B. The recognizer B recognizes whether the input feature-quantity vector is a feature-quantity vector indicating a feature of a predetermined motion on the basis of an identification function $f_b(x_{b1}, x_{b2}, \ldots, x_{bm})$ generated using a technology such as SMV, boosting, logistic regression or the like and outputs a recognition result Rb.

Here, as an example of an identification function for recognizing whether an input feature-quantity vector is a feature-quantity vector indicating a feature of a predetermined motion, examples of a linear identification function, Kernel identification function and nonlinear identification functions are shown below. For example, (Formula 3) shown below represents an example of the linear identification function. In the following, a value indicating a variable x as a vector (i.e., vector value of x) represents a feature-quantity vector in formulas.

[Math. 3]

$$f(\vec{x}) = \sum_{i=1}^{b} \theta_i \cdot \varphi_i(\vec{x}) \qquad \text{(Formula 3)}$$

Further, the function indicated in the second term after sigma at the right-hand side of (Formula 3) shown above corresponds to a basis function. As examples of the basis function, basis functions represented as (Formula 4) to (Formula 6) below may be considered. For example, (Formula 4) shown below represents an example of a basis function based on a polynomial.

[Math. 4]

$$\bar{\phi}(x)^T = (1, x, x^2, x^3, \ldots, x^{b-1}) \qquad \text{(Formula 4)}$$

In addition, (Formula 5) shown below represents an example of a basis function on a Gaussian basis.

[Math. 5]

$$\varphi_i(x) = e^{-\frac{(x-\mu_i)^2}{2s^2}} \qquad \text{(Formula 5)}$$

Furthermore, (Formula 6) shown below represents an example of a basis function based on a trigonometric polynomial.

[Math. 6]

$$\bar{\phi}(x)^T = (1, \sin x, \cos x, \sin 2x, \cos 2x, \ldots, \sin mx, \cos mx) \qquad \text{(Formula 6)}$$

Further, (Formula 7) shown below represents an example of the Kernel identification function.

[Math. 7]

$$f(\vec{x}) = \sum_{i=1}^{b} \theta_i \cdot K(\vec{x}, \vec{x}_i) \qquad \text{(Formula 7)}$$

Meanwhile, the function indicated in the second term after sigma at the right-hand side of (Formula 7) shown above corresponds to a basis function. In addition, a variable indicated as a vector value of $x_1$ in the basis function represents a feature-quantity vector. For example, (Formula 8) shown below represents an example of a basis function based on the Gaussian kernel.

[Math. 8]

$$K(\vec{x}, \vec{x}_i) = e^{-\frac{|\vec{x}-\vec{c}|^2}{2h^2}} \qquad \text{(Formula 8)}$$

in addition, (Formula 9) shown below represents an example of the nonlinear identification function.

[Math. 9]

$$f(\vec{x}) = \sum_{i=1}^{b} \alpha_i \cdot \varphi(\vec{x}; \vec{\beta}_i) \qquad \text{(Formula 9)}$$

Meanwhile, the function indicated in the second term after sigma at the right-hand side of (Formula 9) shown above corresponds to a basis function. As examples of the basis function, basis functions represented as (Formula 10) and (Formula 11) below may be considered. For example, (Formula 10) shown below represents an example of a basis function defined as a sigmoid function.

[Math. 10]

$$\varphi(\vec{x}; \vec{w}, \gamma) = \frac{1}{1 + e^{-\vec{x}^T \vec{w} - \gamma}} \qquad \text{(Formula 10)}$$

In addition, (Formula 11) shown below represents an example of a basis function defined as a Gaussian function.

[Math. 11]

$$\varphi(\vec{x}; \vec{c}, h) = e^{-\frac{|\vec{x}-\vec{c}|^2}{2h^2}} \qquad \text{(Formula 11)}$$

Meanwhile, it is desirable that coefficients (e.g., vector values $\theta_i$, $\alpha_i$ and $\beta_i$) in (Formula 2) to (Formula 11) shown above be set such that recognition results are further deviated from each other when a feature-quantity vector corresponding to a recognition object is data indicating a feature of a predetermined motion and when the feature-quantity vector is data indicating a motion different from the predetermined motion. As a specific example, it is desirable that the coefficients be determined using a large amount of sample data (in other words, teacher data accumulated on the basis of machine learning) such that whether a feature-quantity vector corresponding to a recognition object is data indicating a predetermined motion is identified with as small an error as possible.

According to such configurations, the determination unit 117 may recognize whether a feature-quantity vector is data indicating a feature of a predetermined motion depending on whether or not a recognition processing result for the feature-quantity vector is equal to or higher than a predefined threshold value.

In this way, the determination unit 117 performs recognition processes for the feature-quantity vectors of the information processing device 10 and the wearable terminal 30 to acquire the recognition results Ra and Rb. Then, the determination unit 117 determines whether to cancel the predetermined restriction on the basis of the recognition results (i.e., recognition results Ra and Rb) acquired for the information processing device 10 and the wearable terminal 30.

In a specific example, the determination unit 117 may compare the acquired recognition results Ra and Rb with each other and cancel the predetermined restriction when it is determined that the recognition results Ra and Rb are similar on the basis of the comparison result.

In another example, the determination unit 117 may cancel the predetermined restriction when both of the acquired recognition results Ra and Rb indicate that the corresponding feature-quantity vectors (i.e., the feature-quantity vectors corresponding to the information processing device 10 and the wearable terminal 30) represent data indicating features of predetermined motions.

Meanwhile, the aforementioned recognition processes (i.e., functions $f_a$ and $f_b$ shown in FIG. 15) performed for the feature-quantity vectors of the information processing device 10 and the wearable terminal 30 may not necessarily be the same recognition process as long as the recognition processes may recognize whether the feature-quantity vectors are data indicating features of predetermined motions (in other words, common motions between the information processing device 10 and the wearable terminal 30).

Furthermore, although the aforementioned example describes a case in which the determination unit 117 of the information processing device 10 performs recognition processes f i.e., functions $f_a$ and $f_b$ shown in FIG. 15) for the feature-quantity vectors of the information processing device 10 and the wearable terminal 30, the configuration may not be limited thereto. In a specific example, the information processing device 10 and the wearable terminal 30 may perform recognition processes for the feature-quantity vectors corresponding thereto. In this case, the wearable terminal 30 may perform a recognition process (i.e., function $f_b$ shown in FIG. 15) for the feature-quantity vector corresponding thereto and transmit the result of the recognition process (i.e., recognition result Rb shown in FIG. 15) to the information processing device 10, for example.

The operation of the determination unit 117 described with reference to FIG. 15 is not limited to the information processing system according to modification example 3 and may be applied, for example, as the operation of the determination unit 117 in the information processing system according to the aforementioned embodiment.

An example of control according to restriction cancelation in the information processing system according to modification example 3 has been described with reference to FIGS. 13 to 15.

As described above, when an instantaneous motion (i.e., a large instantaneous position or orientation variation) is detected, the feature extraction unit 115 according to modification example 3 extracts data corresponding to a processing object from detected displacement data using the timing at which the motion is detected as a starting point. Therefore, according to the information processing system of modification example 3, data for determination can be acquired according to cancelation of a predetermined restriction without a user operation applied to a button or a touch panel (i.e., operation for data acquisition other than a predetermined motion for canceling the restriction).

Furthermore, since the information processing system according to modification example 3 extracts data corresponding to a processing object using timing at which an instantaneous motion is detected as a starting point, as described above, the information processing device 10 and the wearable terminal 30 may not necessarily be temporally synchronized with each other. Particularly, in a terminal of which operation is controlled to reduce power consumption, such as the wearable terminal 30, accuracy of information about time may decrease (i.e., an error is generated in time). Even in this situation, the information processing system according to modification example 3 may perform time synchronization between data (e.g., displacement data) of the information processing device 10 and data of the wearable terminal 30 on the basis of the timing at which an instantaneous motion is detected.

Particularly, according to the information processing system according to modification example 3, determination according to restriction cancelation is performed for a result of detection of an instantaneous motion of the user (in other words, instantaneous motions of the information processing device 10 and the wearable terminal 30). In this configuration, the information processing system according to modification example 3 may more clearly identify motions intentionally performed by the user for the information processing device 10 and the wearable terminal 30 from motions unintentionally performed by the user. That is, according to the information processing system according to modification example 3, a situation in which a restriction is canceled according to recognition of a motion unintentionally performed by the user can be prevented.

4.4. Modification Example 4: Example of Information Presentation

Next, an example of information presentation for the user when a predetermined restriction is canceled in the information processing system according to the present embodiment will be described as modification example 4.

In the information processing system according to the present embodiment, as described above, the user may cancel a predetermined restriction by operating (e.g., shaking) both the information processing device 10 and the wearable terminal 30. Particularly, in the information processing system according to modification example 3, the user may instantaneously operate both the information processing device 10 and the wearable terminal 30 at a desired timing in order to cancel a predetermined restriction.

Accordingly, the information processing system does not necessarily require explicit operations for the information processing device 10 or the wearable terminal 30 other than the instantaneous operations. Due to this configuration, a dedicated operation screen for canceling a predetermined restriction may not be presented to the user when the predetermined restriction is canceled in the information processing system according to the present embodiment.

Accordingly, an information processing system according to modification example 4 may display an operation screen based on a previous restriction cancelation function through the display unit of the information processing device 10 or the wearable terminal 30 as the operation screen. As previous restriction cancelation functions, for example, the restriction cancelation function according to comparison example 1 described with reference to FIG. 2 (i.e., the restriction cancelation function depending on slider operation), the restriction cancelation function according to comparison example 2 described with reference to FIG. 3 (i.e., the restriction cancelation function according to input of an operation pattern) and the like may be considered.

In this case, the information processing system. According to modification example 4 may determine whether to cancel a predetermined restriction on the basis of a previous restriction cancelation function when the user performs an operation with respect to restriction cancelation for the displayed operation screen.

According to this configuration, the user may selectively execute the functions for restriction cancelation according to the aforementioned embodiment and the modification examples and previous restriction cancelation functions for the information processing system when a predetermined restriction is canceled.

As another example, when the functions for restriction cancelation according to the aforementioned embodiment and the modification examples are executed, the information processing system according to modification example 4 may present information based on results of execution of the functions to the user.

For example, when a predetermined restriction is not canceled on the basis of operations of both the information processing device 10 and the wearable terminal 30, the information processing system according to modification example 4 may present the cause of determination as "restriction is not canceled" to the user.

In a specific example, when displacement data is not acquired from the wearable terminal 30, the information processing system may present that acquisition of the displacement data fails to the user. At this time, the information processing system may present the cause of failure of acquisition of the displacement data from the wearable terminal 30 to the user. As the cause of failure of acquisition of the displacement data from the wearable terminal 30, for example, a case in which communication between the information processing device 10 and the wearable terminal 30 fails, a case in which the wearable terminal 30 is powered off or the like may be considered.

In addition, the information processing system may be configured such that on and off of the functions for restriction cancelation according to the aforementioned embodiment and modification examples may be switched by a user operation. In such a configuration, when a function for restriction cancelation is off, the information processing system according to modification example 4 may present that the function is off to the user when the user performs an operation for restriction cancelation by the function.

In another example, the information processing system according to modification example 4 may present a determination result based on feature-quantity vectors corresponding to the information processing device 10 and the wearable terminal 30 to the user. As a specific example, the information processing system may present a result of determination of similarity between the feature-quantity vectors of the information processing device 10 and the wearable terminal 30 as a numerical value to the user. Accordingly, the user may visually recognize how much motions of the information processing device 10 and the wearable terminal 30 differ from each other when restriction cancelation is not performed on the basis of a predetermined operation (e.g., an operation of shaking the information processing device 10 and the wearable terminal 30 or an operation of twisting a hand holding the devices).

In this way, the information processing system according to modification example 4 may directly or indirectly display, to the user, a behavior that the user should perform next by presenting information based on results of execution of the functions for restriction cancelation according to the aforementioned embodiment and modification examples.

5. HARDWARE CONFIGURATION

Figure 12:
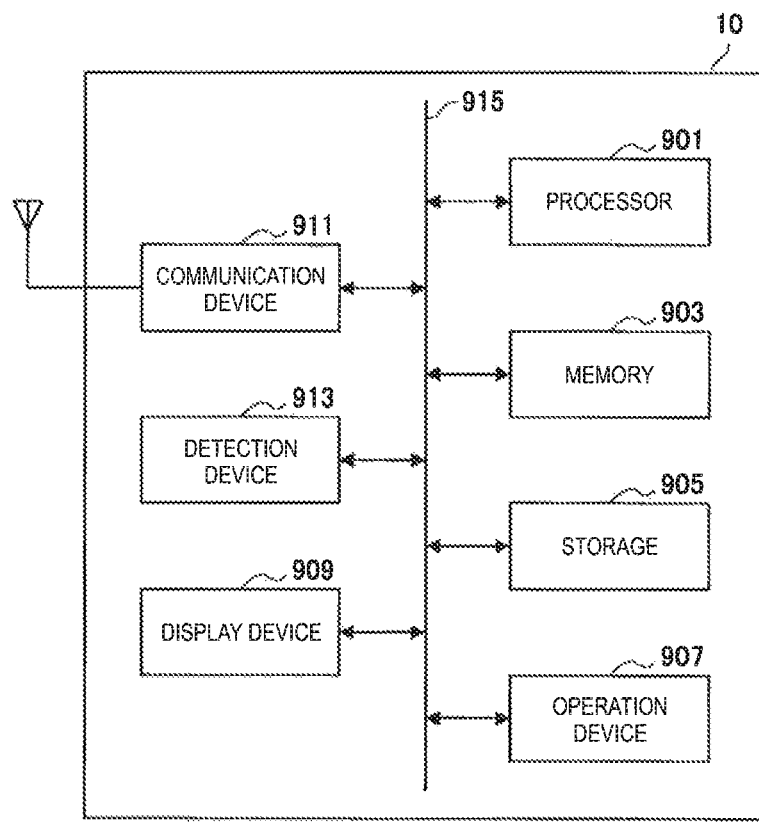
FIG. 12 is a diagram illustrating an example of a hardware configuration of an information processing device according to the embodiment.

Next, an example of a hardware configuration of the information processing device 10 according to each embodiment of the present disclosure will be described with reference to FIG. 12. FIG. 12 is a diagram illustrating an example of the hardware configuration of the information processing device 10 according to an embodiment of the present disclosure.

As shown in FIG. 12, the information processing device 10 according to the present embodiment includes a processor 901, a memory 903, a storage 905, an operation device 907, a display device 909, a communication device 911, a detection device 913 and a bus 915.

The processor 901 may be a central processing unit (CPU), a graphics processing unit (GPU), a digital signal processor (DSP) or a system on chip (SoC), for example, and performs various processes of the information processing device 10.

For example, the processor 901 may be configured as an electronic circuit for performing various arithmetic processes. Further, the configuration of the aforementioned controller 11 may be realized by the processor 901.

The memory 903 includes a random access memory (RAM) and a read only memory (ROM) and stores programs executed by the processor 901 and data. The storage 905 may include a storage medium such as a semiconductor memory or a hard disk.

The operation device 907 has a function of generating an input signal for performing a desired operation of a user. The operation device 907 may be configured as a touch panel, for example. As another example, the operation device 907 may be composed of an input unit through which the user inputs information, for example, a button, a switch and the like, an input control circuit that generates an input signal based on input from the user and provides the input signal to the processor 901 and the like. Meanwhile, the aforementioned operation unit 151 may be realized by the operation device 907.

The display device 909 is an example of an output device and may be a device such as a liquid crystal display (LCD) device or an organic light emitting diode (OLED) display. In this case, the display device 909 may present predetermined information to the user by displaying a screen. In addition, the aforementioned display unit 153 may be realized by the display device 909.

The communication device 911 is a communication means included in the information processing device 10 and communicates with an external device through a network. The communication device 911 is a wired or wireless communication interface. When the communication device 911 is configured as a wireless communication interface, the communication device 911 may include a communication antenna, a radio frequency (RF) circuit, a baseband processor and the like.

The communication device 911 has a function of performing various signal processes on a signal from an external device and may provide a digital signal generated from a received analog signal to the processor 901. In addition, the aforementioned communication unit 17 may be realized by the communication device 911.

The detection device 913 is a device for detecting variations in the position and orientation of the housing of the information processing device 10. For example, the detection device 913 may be composed of various sensors such as an acceleration sensor, an angular velocity sensor, etc. in addition, the aforementioned sensor unit 13 may be realized by the detection device 913.

The bus 915 connects the processor 901, the memory 903, the storage 905, the operation device 907, the display device 909, the communication device 911 and the detection device 913 to one another. The bus 915 may include a plurality of types of buses.

Furthermore, a program for causing hardware such as a processor, a memory and a storage included in a computer to execute the same functions as components of the aforementioned information processing device 10 may be created. In addition, a computer readable recording medium storing the program may be provided.

6. CONCLUSION

As described above, in the information processing system according to the present embodiment, the information processing device 10 acquires a feature-quantity vector (e.g., displacement data) that directly or indirectly indicate variations in a time series, based on shaking, in at least one of the position and orientation of the housing of each of the information processing device 10 and the wearable terminal 30. Then, the information processing device 10 cancels a predetermined restriction set by the lock function on the basis of the feature-quantity vectors acquired for the information processing device 10 and the wearable terminal 30. Specifically, the information processing device 10 executes one or both of determination of whether the information processing device 10 and the wearable terminal 30 are shaken and determination of similarity between the feature-quantity vectors of the information processing device 10 and the wearable terminal 30 on the basis of the feature-quantity vectors of the information processing device 10 and the wearable terminal 30. Then, the information processing device 10 cancels the predetermined restriction set by the lock function on the basis of the result of executed determination.

According to this configuration, different data is generated whenever the restriction is canceled as the acquired feature-quantity vectors in the information processing system according to the present embodiment. Accordingly, the information processing system according to the present embodiment may suppress occurrence of a situation in which information for restriction cancelation is leaked because a malicious user views it without permission as in shoulder hacking and illegally cancels the restriction.

In addition, in the information processing system according to the present embodiment, it is difficult for a malicious user to cancel the restriction of the information processing device 10 only through the information processing device 10. That is, the malicious user would need to acquire both the information processing device 10 and the wearable terminal 30 to cancel the restriction of the information processing device 10. Furthermore, a probability of the owner of the information processing device 10 and the wearable terminal 30 losing both the information processing device 10 and the wearable terminal 30 is lower than a probability of losing only one of the information processing device 10 and the wearable terminal 30. Accordingly, the information processing system according to the present embodiment may ensure relatively high security from the viewpoint of operation.

In addition, in the information processing system according to the present embodiment, the user needs to intentionally shake both the information processing device 10 and the wearable terminal 30 when the restriction is canceled. Accordingly, a situation in which the restriction is canceled at a timing that is not intended by the user as in the example mentioned above as comparison example 4 (refer to FIG. 4) can be prevented.

Moreover, in the information processing system according to the present embodiment, the user need only shaking both the information processing device 10 and the wearable terminal 30 to cancel the restriction without a complicated procedure for canceling the restriction.

Furthermore, the information processing system according to the present embodiment can be realized as long as the information processing device 10 and the wearable terminal 30 include communication devices for transmitting/receiving data to/from each other and sensors (e.g., acceleration sensors) for detecting shaking of the housings. Such devices are devices generally installed in portable information processing devices such as so-called smartphones in recent years. Accordingly, the aforementioned information processing system according to the present embodiment can be realized by using older devices for the information processing device 10 and the wearable terminal 30 without installing special devices.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device including:

an acquisition unit that acquires a feature-quantity vector directly or indirectly indicating variations in a time series in at least one of a position and orientation of a housing of each of a plurality of different devices that are previously associated; and a controller that cancels a predetermined restriction set in advance, on the basis of the acquired feature-quantity vector corresponding to each of the plurality of devices.

(2)

The information processing device according to (1), wherein the acquisition unit is installed in the housing of one of the plurality of devices and acquires, from another device linked to the device through a network, the feature-quantity vector corresponding to the other device.

(3)

The information processing device according to (1), wherein the controller determines similarity between the feature-quantity vectors corresponding to the plurality of devices on the basis of comparison between the feature-quantity vectors corresponding to the plurality of devices and cancels the predetermined restriction on the basis of a determination result.

(4)

The information processing device according to (3), wherein the controller determines the similarity on the basis of statistical distances between the feature-quantity vectors corresponding to the plurality of devices.

(5)

The information processing device according to (3), wherein the controller determines the similarity on the basis of correlation in a time series between the feature-quantity vectors corresponding to the plurality of devices.

(6)

The information processing device according to (3), wherein the controller determines the similarity on the basis of the relative quantity of information between the feature-quantity vectors corresponding to the plurality of devices.

(7)

The information processing device according to (3), wherein the controller determines similarity between the acquired feature-quantity vectors corresponding to the plurality of devices on the basis of teacher data previously accumulated on the basis of machine learning and obtained by mapping the feature-quantity vectors corresponding to the plurality of devices to a result of determination of similarity between the extracted feature-quantity vectors.

(8)

The information processing device according to any one of (3) to (7), wherein the controller shifts at least one of the feature-quantity vectors corresponding to the plurality of devices in a time series and determines the similarity on the basis of the shifted feature-quantity vector.

(9)

The information processing device according to (8), wherein the controller shifts at least one of the feature-quantity vectors corresponding to the plurality of devices in the time series such that statistical distances between the feature-quantity vectors become smaller.

(10)

The information processing device according to (8) or (9), wherein the controller shifts at least one of the feature-quantity vectors corresponding to the plurality of devices in the time series within a range that does not exceed a predefined time width.

(11)

The information processing device according to (1), wherein the controller performs a recognition process for recognizing whether the feature-quantity vector corresponding to each of the plurality of devices indicates a feature of a predetermined variation in a time series in at least one of the position and orientation of the housing of the corresponding device, for each of the feature-quantity vectors, and cancels a predetermined restriction set in advance on the basis of a result of the recognition process for each of the feature-quantity vectors.

(12)

The information processing device according to any one of (1) to (11), including:

a feature extraction unit that extracts, from the feature-quantity vectors corresponding to the plurality of devices, feature values indicating features of sample data in the feature-quantity vectors and generates new feature-quantity vectors on the basis of the extracted feature values, wherein the controller cancels the restriction on the basis of comparison between the new feature-quantity vectors corresponding to the plurality of devices.

(13)

The information processing device according to (12), wherein the feature extraction unit extracts displacement in a principal component direction in the time series of sample data included in the feature-quantity vectors as the feature values on the basis of principal component analysis for the feature-quantity vectors.

(14)

The information processing device according to (12), wherein the feature extraction unit specifies a direction having a high correlation of displacement in the time series between the feature-quantity vectors corresponding to the plurality of devices on the basis of canonical correlation analysis for the feature-quantity vectors, and extracts displacement in the specified direction in the time series of sample data included in the feature values as the feature-quantity values.

(15)

The information processing device according to any one of (1) to (14), including:

a data interpolation unit that interpolates new sample data for the feature-quantity vectors on the basis of sample data indicating variations in the time series and included in the feature-quantity vectors, wherein the controller cancels the restriction on the basis of comparison between the feature-quantity vectors corresponding to the plurality of devices, for which the new sample data has been interpolated.

(16)

The information processing device according to (15), wherein the data interpolation unit interpolates the new sample data for the feature-quantity vectors on the basis of polynomial interpolation.

(17)

The information processing device according to (15), wherein the data interpolation unit configures a model indicating the sample data included in the feature-quantity vectors on the basis of linear regression and interpolates the new sample data on the basis of the model.

(18)

The information processing device according to any one of (1) to (17), wherein at least one of the plurality of devices is a wearable device capable of being worn on the body of a person when used.

(19)

An information processing method including:

acquiring a feature-quantity vector directly or indirectly indicating variations in a time series in at least one of a position and orientation of a housing of each of a plurality of different devices previously associated; and canceling, by a processor, a predetermined restriction set in advance, on the basis of comparison between the acquired feature-quantity vectors corresponding to the plurality of devices.

(20) An information processing system including:

a plurality of devices each including a detection unit that detects variations in a time series in at least one of a position and orientation of a housing;

an acquisition unit that acquires a feature-quantity vector directly or indirectly indicating the detected variations in the time series, for each of the plurality of devices; and a controller that cancels a predetermined restriction set in advance on the basis of comparison between the acquired feature-quantity vectors corresponding to the plurality of devices.

REFERENCE SIGNS LIST 10 information processing device
11 controller
111 displacement data acquisition unit
113 data interpolation unit
115 feature extraction unit
117 determination unit
13 sensor unit
15 UI
151 operation unit
153 display unit
17 communication unit
30 wearable terminal
31 controller
33 sensor unit
35 UI
351 operation unit
353 display unit
37 communication unit

The invention claimed is:

1. An information processing device comprising:
 an acquisition unit that acquires a feature-quantity vector directly or indirectly indicating variations in a time series in at least one of a position or an orientation of a housing of each device of a plurality of different devices that are previously associated with one another through a network; and
 a controller that cancels a predetermined restriction set in advance, on the basis of comparison of the acquired feature-quantity vector corresponding to each device of the plurality of devices,
 wherein the predetermined restriction is set by a lock function applied to at least one device of the plurality of devices,
 wherein the controller determines similarity between the acquired feature-quantity vectors corresponding to the plurality of devices on the basis of teacher data previously accumulated on the basis of machine learning and cancels the predetermined restriction on the basis of a result of the determination of similarity, and
 wherein the acquisition unit is implemented via at least one processor.

2. The information processing device according to claim 1, wherein the acquisition unit is installed in the housing of one of the plurality of devices and acquires, from another associated device linked to the device through the network, the feature-quantity vector corresponding to the other associated device.

3. The information processing device according to claim 1, wherein the controller determines the similarity on the basis of statistical distances between the feature-quantity vectors corresponding to the plurality of devices.

4. The information processing device according to claim 1, wherein the controller determines the similarity on the basis of correlation in a time series between the feature-quantity vectors corresponding to the plurality of devices.

5. The information processing device according to claim 1, wherein the controller determines the similarity on the basis of the relative quantity of information between the feature-quantity vectors corresponding to the plurality of devices.

6. The information processing device according to claim 1, wherein the controller shifts at least one of the feature-quantity vectors corresponding to the plurality of devices in a time series and determines the similarity on the basis of the shifted feature-quantity vector.

7. The information processing device according to claim 6, wherein the controller shifts at least one of the feature-quantity vectors corresponding to the plurality of devices in the time series such that statistical distances between the feature-quantity vectors become smaller.

8. The information processing device according to claim 6, wherein the controller shifts at least one of the feature-quantity vectors corresponding to the plurality of devices in the time series within a range that does not exceed a predefined time width.

9. The information processing device according to claim 1, wherein the controller performs a recognition process for recognizing whether the feature-quantity vector corresponding to each device of the plurality of devices indicates a feature of a predetermined variation in a time series in at least one of the position or the orientation of the housing of the corresponding device, for each of the feature-quantity vectors, and cancels the predetermined restriction set in advance on the basis of a result of the recognition process for each of the feature-quantity vectors.

10. The information processing device according to claim 1, further comprising:
 a feature extraction unit that extracts, from the feature-quantity vectors corresponding to the plurality of devices, feature values indicating features of sample data in the feature-quantity vectors and generates new feature-quantity vectors on the basis of the extracted feature values,
 wherein the controller cancels the restriction on the basis of comparison between the new feature-quantity vectors corresponding to the plurality of devices, and
 wherein the feature extraction unit is implemented via at least one processor.

11. The information processing device according to claim 10, wherein the feature extraction unit extracts displacement in a principal component direction in the time series of sample data included in the feature-quantity vectors as the feature values on the basis of principal component analysis for the feature-quantity vectors.

12. The information processing device according to claim 10, wherein the feature extraction unit specifies a direction having a high correlation of displacement in the time series between the feature-quantity vectors corresponding to the plurality of devices on the basis of canonical correlation analysis for the feature-quantity vectors, and extracts displacement in the specified direction in the time series of sample data included in the feature values as the feature-quantity values.

13. The information processing device according to claim 1, further comprising:
  a data interpolation unit that interpolates new sample data for the feature-quantity vectors on the basis of sample data indicating variations in the time series and included in the feature-quantity vectors,
  wherein the controller cancels the restriction on the basis of comparison between the feature-quantity vectors corresponding to the plurality of devices, for which the new sample data has been interpolated, and
  wherein the data interpolation unit is implemented via at least one processor.

14. The information processing device according to claim 13, wherein the data interpolation unit interpolates the new sample data for the feature-quantity vectors on the basis of polynomial interpolation.

15. The information processing device according to claim 13, wherein the data interpolation unit configures a model indicating the sample data included in the feature-quantity vectors on the basis of linear regression and interpolates the new sample data on the basis of the model.

16. The information processing device according to claim 1, wherein at least one device of the plurality of devices is a wearable device configured to be worn on a body of a person when used.

17. The information processing device according to claim 1, wherein the acquired feature-quantity vector corresponding to each device comprises a waveform having a frequency spectrum indicating displacement of the device in the time series.

18. The information processing device according to claim 1, wherein the controller determines the similarity based on an identification function generated by a learning algorithm.

19. The information processing device according to claim 18, wherein the learning algorithm comprises at least one of:
  a machine learning algorithm;
  a linear support vector machine;
  a kernel support vector machine; or
  logistic regression.

20. An information processing method, executed by at least one processor, the method comprising:
  acquiring a feature-quantity vector directly or indirectly indicating variations in a time series in at least one of a position or an orientation of a housing of each device of a plurality of different devices that are previously associated with one another through a network; and
  canceling, by a processor, a predetermined restriction set in advance, on the basis of comparison between the acquired feature-quantity vectors corresponding to each device of the plurality of devices,
  wherein the predetermined restriction is set by a lock function applied to at least one device of the plurality of devices, and
  wherein similarity between the acquired feature-quantity vectors corresponding to the plurality of devices is determined on the basis of teacher data previously accumulated on the basis of machine learning and the predetermined restriction is canceled on the basis of a result of the determination of similarity.

21. An information processing system comprising:
  a plurality of devices that are previously associated with one another through a network, each device of the plurality of devices including
  a detection unit that detects variations in a time series in at least one of a position or an orientation of a housing of the device,
  an acquisition unit that acquires a feature-quantity vector directly or indirectly indicating the detected variations in the time series, for each device of the plurality of devices, and
  a controller that cancels a predetermined restriction set in advance on the basis of comparison between the acquired feature-quantity vectors corresponding to each device of the plurality of devices,
  wherein the predetermined restriction is set by a lock function applied to at least one device of the plurality of devices,
  wherein the controller determines similarity between the acquired feature-quantity vectors corresponding to the plurality of devices on the basis of teacher data previously accumulated on the basis of machine learning and cancels the predetermined restriction on the basis of a result of the determination of similarity, and
  wherein the detection unit and the acquisition unit are each implemented via at least one processor.

* * * * *